(12) United States Patent
Drewes

(10) Patent No.: US 9,947,313 B2
(45) Date of Patent: Apr. 17, 2018

(54) METHOD FOR SUBSTANTIAL ONGOING CUMULATIVE VOICE RECOGNITION ERROR REDUCTION

(71) Applicant: William Drewes, Hadera (IL)

(72) Inventor: William Drewes, Hadera (IL)

( * ) Notice: Subject to any disclaimer, the term of this patent is extended or adjusted under 35 U.S.C. 154(b) by 0 days.

(21) Appl. No.: 15/415,850

(22) Filed: Jan. 25, 2017

(65) Prior Publication Data

US 2017/0133007 A1    May 11, 2017

Related U.S. Application Data

(63) Continuation-in-part of application No. 15/006,092, filed on Jan. 25, 2016.

(60) Provisional application No. 62/107,839, filed on Jan. 26, 2015, provisional application No. 62/143,051, filed on Apr. 4, 2015, provisional application No. 62/159,253, filed on May 9, 2015, provisional application No. 62/185,511, filed on Jun. 26, 2015, provisional application No. 62/209,050, filed on Aug. 24, 2015.

(51) Int. Cl.

| | |
|---|---|
| *G10L 15/00* | (2013.01) |
| *G10L 15/06* | (2013.01) |
| *G06F 17/27* | (2006.01) |
| *G10L 15/02* | (2006.01) |
| *G10L 25/51* | (2013.01) |

(52) U.S. Cl.
CPC ........ *G10L 15/063* (2013.01); *G06F 17/2735* (2013.01); *G10L 15/02* (2013.01); *G10L 25/51* (2013.01); *G10L 2015/0635* (2013.01)

(58) Field of Classification Search
USPC .............. 704/231, 239, 246, 247, 251, 252
See application file for complete search history.

(56) References Cited

U.S. PATENT DOCUMENTS

| | | | | |
|---|---|---|---|---|
| 2002/0065633 | A1* | 5/2002 | Levin ..................... | B82Y 15/00 |
| | | | | 702/189 |
| 2003/0036903 | A1* | 2/2003 | Konopka ............... | G10L 15/065 |
| | | | | 704/249 |
| 2004/0158457 | A1* | 8/2004 | Veprek .................. | G10L 13/047 |
| | | | | 704/201 |
| 2008/0270136 | A1* | 10/2008 | Deligne ................. | G10L 15/19 |
| | | | | 704/257 |
| 2009/0204392 | A1* | 8/2009 | Ishikawa ............... | G10L 15/063 |
| | | | | 704/10 |

(Continued)

FOREIGN PATENT DOCUMENTS

EP    0314908 A2    5/1989

*Primary Examiner* — Leonard Saint Cyr

(57) ABSTRACT

In an embodiment, speech is recorded and converted to digital text based on a shared vocabulary dictionary. During the session, voice recognition errors, that is, speech that could not be automatically identified (if any exists), are identified by the system and associated with digital text. When text for the voice recognition error is identified (e.g., by an editor), the shared vocabulary dictionary is updated (so that that particular voice recognition error will not occur again), thereby improving the performance of the system for all users that use the shared vocabulary dictionary. The identification of voice recognitions errors and the updated of the vocabulary dictionary are performed on an ongoing basis, so that the performance of the system for all users continually improves.

26 Claims, 9 Drawing Sheets

(56) References Cited

U.S. PATENT DOCUMENTS

2014/0039893 A1* 2/2014 Weiner .................... G06F 3/167
704/249
2015/0127321 A1* 5/2015 Waibel .................. G10L 15/265
704/2

* cited by examiner

System Flow Overview Diagram

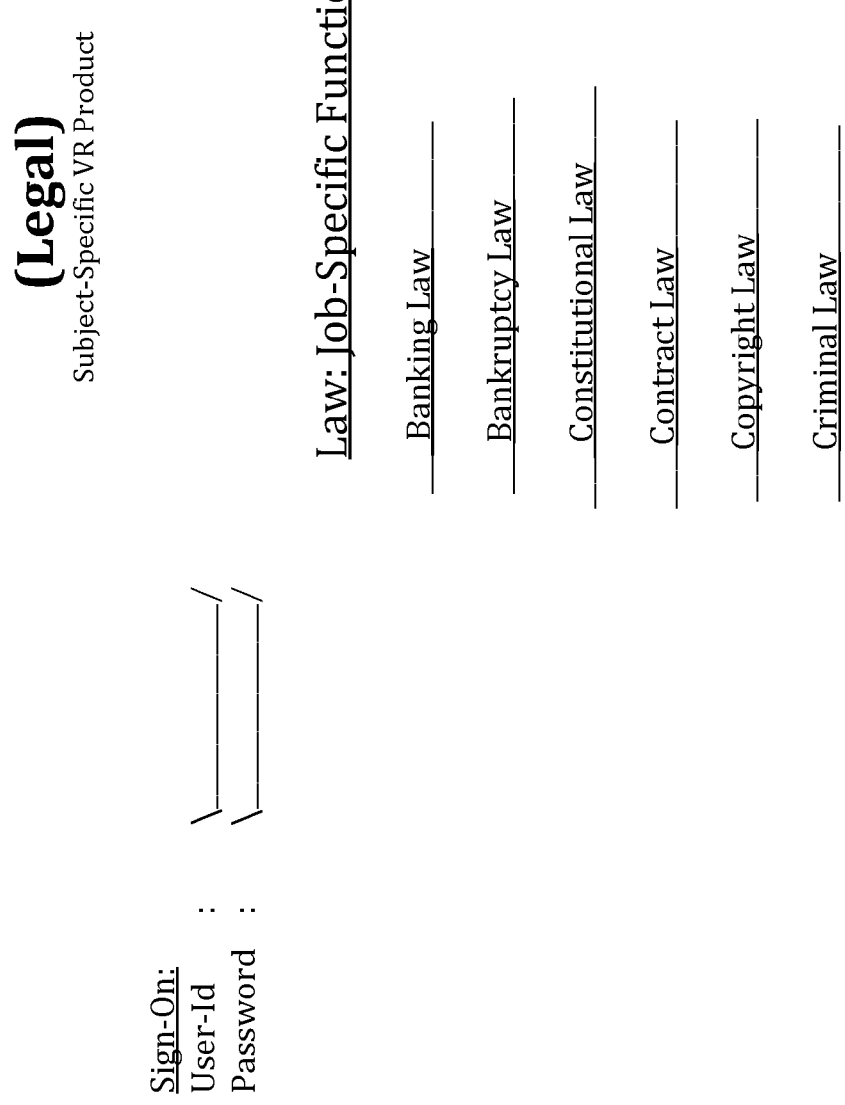

FIGURE 3 - The Voice Recognition Error – Audio & Sentence Editing Screen

EXAMPLE 1 of 3 – AUDIO EDITING (BEFORE)

/CUT WORD/ /HEAR CUTS MADE/ /RESET/ /SAVE CUTS/ /SLOW AUDIO SPEED

Undo Cuts now is the time for ■ to come to the ■ of ■ the good of the nation

NOTES:
(1)- Click & Hear Voice Recognition Error (Hear either one or multiple words)
(2)- Separate One Voice Recognition Error, with multiple words, into MULTIPLE VOICE RECOGNITION ERRORS

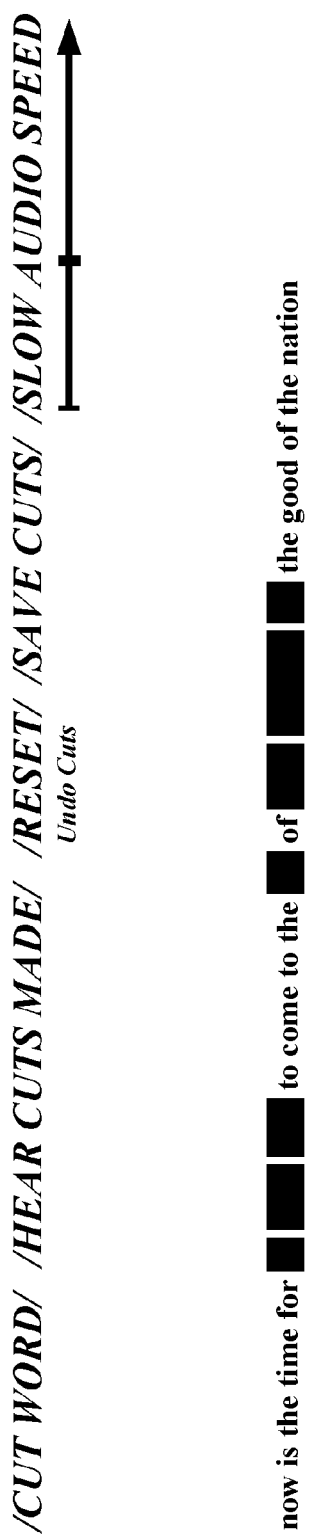

FIGURE 5 - The Voice Recognition Error – Audio & Sentence Editing Screen
EXAMPLE 3 of 3 – *SENTENCE EDITING (AFTER)*

/*CUT WORD*/ /*HEAR CUTS MADE*/ /*RESET*/ /*SAVE CUTS*/ /*SLOW AUDIO SPEED*
*Undo Cuts*

Now is the time for ■ ■ to come to the ■ of ■, ■ the good of the nation.

NOTES:
*(1)- Click & Hear Voice Recognition Error (Hear either one or multiple words)*
*(2)- Separate One Voice Recognition Error, with multiple words, into MULTIPLE VOICE RECOGNITION ERRORS*

FIGURE 6 – The Voice Recognition Error – Error Correction Screen
EXAMPLE 1 of 2 – *VOICE RECOGNITION ERROR CORRECTION (BEFORE)*

(Legal)
Subject-Specific VR Product

Chosen Job-Specific Function   : Sales Department
Session Identification Number  : Z42907201 42374

Right Click (See 1 below)    Left Click (See 2 below)

Sentence Below:

Now is the time for ▓▓▓▓ to come to the ▓▓ of ▓▓▓▓▓, ▓▓ the good of the nation.

---

CORRECT VR ERROR

All words in
Subject-Specific         New Word
Vocabulary               *Type Word Below*
Library

(Existing Word)        _Type Word Here_
*(Drop Down Table)*
                         _____

_____
_____
_____
_____

*NOTES:*
*(1)- Click & Hear entire sentence as spoken by user: "The scheduling and logistics of our new ad campaign and European trade show tour were sent to you yesterday." i.e. Click on any text word.*
*(2)-Click & Hear specific Voice Recognition Error "Word" as spoken by user: "logistics" i.e. Click on highlighted-colored-spaces)*

FIGURE 7 – The Voice Recognition Error – Error Correction Screen
EXAMPLE 2 of 2 – *VOICE RECOGNITION ERROR CORRECTION (AFTER)*

(Legal)
Subject-Specific VR Product

Chosen Job-Specific Function  : Sales Department
Session Identification Number : Z4290720142374

*Right Click (See 1 below)    Left Click (See 2 below)*

Sentence Below:

Now is the time for all good men to come to the aid of their country, for the good of the nation.

_____

CORRECT VR ERROR

All words in
Subject-Specific               New Word
Vocabulary                     *Type Word Below*
Library
(Existing Word)
*(Drop Down Table)*            *Type Word Here*
                               _____

_____
_____
_____
_____

*NOTES:*
*(1).- Click & Hear entire sentence as spoken by user: "The scheduling and logistics of our new ad campaign and European trade show tour were sent to you yesterday". (i.e. Click on any text word.*
*(2)-Click & Hear specific Voice Recognition Error "Word" as spoken by user: "logistics". (i.e. Click on highlighted-colored-spaces)*

METHOD FOR SUBSTANTIAL ONGOING CUMULATIVE VOICE RECOGNITION ERROR REDUCTION

CROSS SECTION TO RELATED APPLICATIONS

This application is a continuation-in-part of U.S. patent application Ser. No. 15/006,092, filed on Jan. 25, 2016, which claims priority from U.S. provisional application Ser. No. 62/107,839 filed on Jan. 26, 2015, U.S. provisional application Ser. No. 62/143,051 filed on Apr. 4, 2015, and U.S. provisional application Ser. No. 62/159,253 filed on May 9, 2015, and U.S. provisional application Ser. No. 62/185,511 filed on Jun. 26, 2015, and U.S. provisional application Ser. No. 62/209,050 filed on Aug. 24, 2015. All of the above applications are incorporated herein by reference.

(1)—BACKGROUND OF THE INVENTION

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

1.1—Voice Recognition Nomenclature

As used herein, the terms "Voice Recognition" (VR), "Speech Recognition" (SR), "Automatic Speech Recognition" (ASR), "Computer Speech Recognition (CSR)", and just "Speech To Text" (STT) are used interchangeably. Throughout this specification where ever one of these terms occurs any of the other terms may be substituted to obtain different embodiments.

1.2—Different Scientific Approaches

There are at least two widely used scientific approaches in use today for implementing Voice recognition, which include (1)—Hidden Markov models, and (2)—neural networks. The methods and systems disclosed herein are approach-independent, and may incorporate any of the above specified approaches or any other underlying scientific approach used to implement voice recognition.

1.3—Evolution of Voice Recognition

Earlier versions of voice recognition software were limited to Navigation and Discrete Dictation programs. Speech recognition software used for "Navigation" is limited to commands that control an application. "Discrete Dictation" systems identify each individual word that is spoken; thus requiring the speaker to pause between each word, so that the computer can identify each word.

Later software uses "Continuous Dictation" systems. With continuous systems, users speak at a natural pace. When spoken at a natural pace, words are blurred together and the acoustics of each word, that is, the way each word sounds and/or is pronounced, changes depending on the preceding and subsequent words.

1.4—Some Principles of Voice Recognition

Understanding how voice recognition software works is a helpful to understanding the causes of voice recognition errors, and the basic problem associated with voice recognition technology.

Speech may be converted to digital text based on vocabulary models and language models as follows:

1.4.1—the Vocabulary Model (which May Also be Referred to as the "Vocabulary Dictionary")

"Vocabulary Models" is a database that stores matches between multiple samples of the acoustics of the spoken word in association with the digital text of the word in a pre-defined dictionary (e.g., a vocabulary dictionary).

The vocabulary model can be created by the cumulative input of all previously spoken words (word acoustics), associated with the digital text of the word, where the spoken words have been previously correctly recognized by the voice recognition software.

The vocabulary model will include errors in voice recognition that were corrected. In other words, recordings having words that were previously incorrectly recognized or that the software was not able to recognize (e.g., such as when the acoustics of a spoken word could not be definitively associated with any acoustic word samples in the vocabulary dictionary) that have subsequently been corrected (e.g., the acoustics of the word, as spoken by the user, is added to the vocabulary dictionary and is associated with the correct digital text of the word in the vocabulary dictionary), so that in the future the same word in the same context and/or when pronounced the same way for other reasons (and therefore has the same acoustics) will be recognized.

The vocabulary module may be constructed (in whole or in part) by extracting the acoustics of spoken words in the language module (which is described below) associated with the correct digital text of the word from the language module.

1.4.2—Language Model (Also Known as the "Language Dictionary")

When users talk at a natural pace (continuous speech), words are blurred together and the acoustics of each word changes depending on the preceding and subsequent words. The function of the Language module is to choose sentences which contain the specific preceding and subsequent words which appear in the sentence that is being processed by the vocabulary module (which is used to identify the digital text associated with the word being recognized).

The function of the language model is to assist the vocabulary model to choose both preceding and subsequent words in a sentence, or part of a sentence, that are likely to occur in a sentence that is being processed by the vocabulary module.

The language model can be created and/or augmented by the cumulative input of the acoustics of all previously user spoken words (e.g., the corresponding user spoken sentence and/or word acoustics and the correct digital text spelling of the words) that have been correctly recognized by the Voice Recognition software.

It should be noted that the Language Model will include sentences that were previously spoken where the voice recognition initial was not able to identify the word being spoken with previous word voice recognition errors that have subsequently been corrected.

It is the purpose of the Language model that the accumulated sentences contained therein (and corresponding sentence and/or word acoustics) may be the same, or at least have the same previous and subsequent words that appear in the sentence being processed by the Vocabulary module.

1.5—Subject Specific Speech Environment

The term "subject-specific speech" simply means when "everybody" is talking about precisely the same subject (e.g., Industry, Professional or Government Job-Specific Function), the meaning of words become more clear and precise, and it is the norm that the same and similar sentences and phrases are used repetitively on a regular basis.

The subject-specific approach is the only scenario in which the Speech Recognitions' vocabulary dictionary can realistically contain the required words, with the same previous and subsequent words and corresponding acoustic properties of each of the words, in the vocabulary model (i.e., vocabulary dictionary).

The subject-specific approach is the only scenario in which the Speech Recognitions' language model can realistically and effectively enable the vocabulary by having a high probability of containing sentences, (and corresponding sentence/word acoustics) which include preceding and subsequent words that are likely to occur in a sentence being processed by voice recognition software utilizing the vocabulary model.

1.6—Voice Recognition Errors

Voice recognition errors occur when the acoustics of the spoken word do not definitively (that is, do not statistically definitively) match (for example, a value representative of how good of a match was found is not as great as a particular threshold that characterizes a good match) any of the acoustical samples of:

1.6.1—Any of the acoustical samples of the pronunciation of a word associated with the digital text of said word in Vocabulary Dictionary.

1.6.2—As previously mentioned (see: 1.4.2 above), when users talk at a natural pace (continuous speech), words are blurred together and the acoustics of each word changes depending on the preceding and subsequent words.

The above problem is complex due to the way people speak, as follows: A person will pronounce words differently depending on the time of day, as well as in accordance with their emotional state. Also, during a single presentation or conversation, a person will pronounce the precisely same word, located in different sentences, differently.

1.6.3—Thus, in the case that the spoken word, within a spoken sentence, being processed by the voice recognition software, examining words in the Vocabulary Dictionary as per above, and said spoken word in said spoken sentence contains previous and subsequent words which are located in a sentence in the language module, the acoustic pronunciation of "middle word" (surrounded by the previous word, and followed by the subsequent word), the acoustic pronunciation of the middle word, together with the digital text spelling of the word, located in said library dictionary are provided to the voice recognition module to aid in the examination of said spoken word.

"new words" refers to word acoustic pronunciations and associated digital text that are not contained in the Vocabulary Dictionary. In addition to new words and the issues referenced above, some causes of word voice recognition errors are:

1—Ambient background noise or mispronunciation of a word changes the acoustics of the word.

2—As mentioned above, continuous speech changes the acoustics of individual words due to effects from the preceding and subsequent words.

3—Thus, it is advantageous that the vocabulary dictionary contain multiple acoustic versions of a single word. The more acoustic versions of a word, the better. All of the acoustic versions of the word are associated with a digital text spelling of said word. The more acoustic versions of the words that are absent from the vocabulary dictionary, the higher the probability that voice recognition errors will occur.

4—Thus, it is advantageous that the language dictionary contain multiple digital text sentences stored in the language model, together with the acoustic properties of each word in the sentence—the more, the better. The fewer digital text sentences in the language model, the higher the probability that voice recognition errors will occur.

5—In the case that the language model is domain-independent, meaning that the language model is derived from (e.g., includes) sentences relating to multiple subjects (e.g., any subject), the language model is less able to effectively assist the vocabulary model to choose both preceding and subsequent words in a sentence contained in the language model, that also appears in the sentence being processed by the vocabulary module.

1.7—Different Voice Recognition "Modes" & "Types"

1.7.1—Voice Recognition Modes

Speaker-Dependent Speaker Mode

In order to increase recognition accuracy, many voice recognition systems require the user to undergo a voice recognition training process to enable the system to "get to know" the general characteristics of how the specific user pronounces words. While there are several types of training, typically, text sentences are presented to the user, and the user reads out-load into a microphone these text sentences. Of course, the more sentences and paragraphs read by the user the bigger the sampling of how the user pronounces words, and the better the voice training that results. The problem with voice recognition training is that the level of voice recognition accuracy is limited to the amount of voice recognition training, which for commercial purposes (acceptance by the user), is usually limited to one hour or less.

In an embodiment, "Speaker-Dependent training never stops," meaning that as the user uses the system, the more of the users input is used for training.

Speaker-Dependent Training

In an embodiment, Speaker-Dependent Training (training attuned to a single speaker's voice), every pronunciation of every word in every sentence spoken during every voice recognition session ever conducted by every user is captured, on a cumulative ongoing (post error-correction) basis, and is stored in knowledge-base. The knowledge base may be a relational database (or other database) that may be located remotely from the user (e.g., stored in "the cloud") that stores a recording of the acoustics and digital text associated with a word, subject-specific vocabularies and language dictionaries for each of a collection of specific subject. Although throughout this specification, a relational database or RDB are referred to, any other type of database may be substituted for a relational database to obtain different embodiments.

During Voice Recognition session processing, the Voice Recognition system will access and search the cumulative central remote subject-specific Vocabulary Dictionary to determine if the acoustics of each word that is being processed is either a "known word" or a "voice recognition error".

During the voice recognition error-correction process (described below), voice recognition errors will be corrected (using the actual voice of the speaker and thereby the acoustics of each voice recognition error word and the associated digital text spelling of the word) will be added to the cumulative central remote subject-specific RDB & remote subject-specific Vocabulary & Language Dictionary. Thus, the error-correction process cumulatively improves the voice recognition accuracy of "all users" on an ongoing basis.

Alternately, in order to reduce the search processing to only one specific "speaker-dependent" users' words and sentences, the RDB containing data relating to the speakers "user-id and "speaker-mode" (i.e., speaker-dependent) may be used to periodically download mini vocabulary dictionaries containing only one speaker-dependent user's cumulative data to the PC of each and every speaker-dependent user of the voice recognition system.

During Voice Recognition session processing session for a specific speaker-dependent user, the Voice Recognition first search the speaker-dependent users' PC mini vocabulary dictionary system to determine if the acoustics of the word being processed is a "known word". Only in the case that the word being processed by the voice recognition system is found to be "not known" to the speaker-dependent users' PC mini vocabulary dictionary, then the cumulative central remote subject-specific Vocabulary Dictionary will be searched to determine if the acoustics of a word being processed is either a "known word" or a "voice recognition error".

During the voice recognition error-correction process (described below), voice recognition errors will be corrected and thereby the acoustics of each voice recognition error word and the associated digital text spelling of the word) will be added to the cumulative central remote subject-specific RDB and remote subject-specific Vocabulary Dictionary. Thus, the error-correction process cumulatively improves the voice recognition accuracy of "all users" on an ongoing basis.

Speaker-Independent Speaker Mode

There are many applications, such as inputting an audio recording of one or more people talking (e.g. "any-person talking) during which voice recognition has no sampling of the speakers' voice, which is inherently less accurate than "Speaker-Specific Speech". The only training the voice recognition system has is preloaded (background) samples of user speech which comes together with the product.

Here too, even with speaker-independent speech, "User-Independent training never stops".

Speaker-Independent Training

With speaker-independent training (training attuned to any speaker's voice), every pronunciation of every word in every sentence spoken during every voice recognition session ever conducted by each and every user is captured, on a cumulative ongoing (post error-correction) basis, and is stored in the knowledge-base (e.g. a central remote subject-specific RDB & The remote subject-specific Vocabulary & Language Dictionaries).

While processing a session, during voice recognition, the voice recognition system may access and search the cumulative central remote subject-specific Vocabulary Dictionary to determine if the acoustics of each word that is being processed is either a known word (a pronunciation-of-a-word already in the knowledge base) or a voice recognition error (a pronunciation-of-a-word not in the knowledge base).

During the voice recognition error-correction process (described below), voice recognition errors are corrected (using the actual voice of the speaker and thereby the acoustics of each voice recognition error word and the associated digital text spelling of the word) are added to the cumulative central remote subject-specific RDB and the remote subject-specific vocabulary and language dictionaries. Thus, the error-correction process cumulatively improves the voice recognition accuracy of "all users" on an ongoing basis.

During the processing of a voice recognition session for a specific speaker-independent user the cumulative central remote subject-specific vocabulary dictionary is searched to determine if the acoustics of a word being processed is either a known word or a voice recognition error.

During the voice recognition error-correction process (described below), voice recognition errors are corrected and then the acoustics of each voice recognition error word and the associated digital text spelling of the word) is added to the cumulative central remote subject-specific RDB & remote subject-specific vocabulary dictionary. Thus, the error-correction process cumulatively improves the voice recognition accuracy of "all users" on an ongoing basis.

1.7.2—Voice Recognition Types

Sentences & Continuous Unedited Text

There are basically two ways in which voice recognition systems are used (i.e. Two "Types")

Sentences

First, user dictation systems are provided that include a Graphical User Interface (GUI) and/or a voice command interface that enables the user, during the voice recognition session, to edit each spoken sentence with grammatical punctuation, such as a capital letter for the beginning of the sentence, commas, semicolons, and a period at the end of each sentence. In an embodiment, the minimum requirement for a sentence is a capitalize letter in the first word of a sentence and a period at the end of the sentence.

Continuous Unedited Text

A second type of voice recognition will be referred to as continuous unedited text, which refers to voice recognition systems that can capture the voice of one or more people talking, without the use of a structured text dictation system (structured text dictation system, as described above, enables user initiated grammatical punctuation). With this use of voice recognition, the voice recognition system captures a person or people talking on-the-fly and receives no indication of where a sentence begins, where a sentence ends (i.e., a period) or any other grammatical information. As a result, the voice recognition output for continuous unedited text is a continuing string of individual lower case text words, including voice recognition errors.

In this specification, the term "continuous unedited text" is used interchangeably with the term to as "continuous unedited speech"—either may be substituted for the other to obtain different embodiments.

Continuous unedited speech may be used in either the user-specific-speaker mode or user-independent speaker mode.

1.8—Technology that Improve the Performance of Voice Recognition:

1—Speech Enhancement: (Existing Technology)

Speech Enhancement technology aims to improve speech quality by using various algorithms. The objective of enhancement is improvement in intelligibility and/or overall perceptual quality of degraded speech signal using audio signal processing techniques.

Enhancing of speech degraded by noise, or noise reduction, is a field of speech enhancement, and used for many applications such as mobile phones, VoIP, teleconferencing systems, speech recognition and hearing aids.

Without specific mention, and by way of inclusion, the above detailed speech enhancement technology may be included in any embodiment of this specification, such as the embodiments disclosed in the "Summary of the Invention" and "Detailed Description of the Invention" section of this specification.

(2)—SUMMARY OF THE INVENTION 2.1—Present Approach

Separate Subject-Specific Voice Recognition Products, Each Individual Product Relating to One Specific Vertical Industry, Profession or Government Agency:

Each vertical industry, each company, each profession, and each Government agency may have a separate and unique subject-specific Voice Recognition Product, which utilizes multiple voice recognition "Engines" (consisting of a subject-specific pair of vocabulary dictionaries and language dictionaries). Each individual "Engine" (i.e., one specific vocabulary dictionary plus one specific language dictionary), corresponds to a particular vertical industry job function, profession, and/or government agency's department job-specific function, and the like.

2.2—Present Invention Technology:

During the actual processing of each user voice recognition session (e.g., during the dictation of a document), for a selected subject-specific voice recognition engine (above), the voice recognition software and/or knowledge base is modified to record and enable the extraction of each the audio pronunciation of each consecutive word being processed (during run-time processing) by the voice recognition product, and the digital text of said word. The extraction of the audio pronunciation is performed by the software, and the extraction is performed for each speaker of each voice recognition session.

For each word the system also records and extracts an indication of whether the word was a "Voice Recognition Error", meaning that the sound of the word did not match one of the many acoustical pronunciations of the word associated with a predefined spelling of the written text word located in the subject-specific voice recognition Engine (above).

During the above described process the system also extracts comprehensive identification information, which may identify the specific company, agency, user, session and/or purpose of the conversation.

The above information extracted during each users' voice recognition sessions, is utilized by a product computer program, located within each user's computing device, to generate sequential computer records, which are then transmitted to a Relational Data Base (RDB) containing the identifying information and the audio recording of the words spoken, recording each and every user of the system during all subject-specific voice recognition sessions conducted by every user of the system on an ongoing cumulative basis.

The above mentioned relational data base is subsequently utilized during the present invention's error correction process, as well as post error correction update of the RDB and each subject-specific Vocabulary Dictionary and Language Dictionary pair.

2.3—Significant Ongoing Cumulative Improvement in Voice Recognition Accuracy

Multiple companies in the same vertical industry inherently have the same subject-specific functional or task specific units or areas (e.g., departments) or have subject-specific functional or task specific units or areas (e.g., departments) that have significant overlaps of in function or task. The correction of a subject-specific voice recognition error in any functional unit of one vertical industry company, professional, or government agency, updates all the respective corresponding subject-specific "Engines" (vocabulary libraries and language libraries) of "all companies" or "government agencies" or "single users" who purchased an appropriate license for a particular subject-specific speech recognition product.

The correction of a subject-specific voice recognition error in any functional unit of one single entity license (e.g., a license for a specific vertical industry company, specific professional company, or specific individual, government agency), updates the corresponding subject-specific "Engine" (vocabulary library and language library pair) specific to the one said single entity license'. The licensee may be a single "vertical industry company", professional company, government agency or "single user" who purchased an appropriate license for a particular subject-specific speech recognition product.

The correction of a subject-specific voice recognition error in any functional unit of one subject-specific product license (e.g. license for a specific vertical industry company, professional company, government agency or "individual licensee"), updates the corresponding subject-specific "Engine" (vocabulary library and language library pair), used concurrently by all licensees' of said subject-specific voice recognition product.

As a result, a single user, after one year will benefit from a voice recognition performance improvement corresponding to the cumulative voice recognition error corrections during that one year period. Furthermore, a single vertical industry product with 5,000 users and 300 full time post-editors correcting voice recognition errors within voice recognition sessions performed by voice recognition product users in all the various departments of each organization, will benefit from a voice recognition performance improvement corresponding to three hundred (300) cumulative years of full time voice recognition error correction per year.

The "cumulative improvement" of the above subject-specified vocabulary models and language models will significantly reduce the rate (% amount) of voice recognition errors for each particular vertical industry, profession or government agency to the point of being "rare occurrence".

Any of the above embodiments may be used alone or together with one another in any combination. Inventions encompassed within this specification may also include embodiments that are only partially mentioned or alluded to or are not mentioned or alluded to at all in this brief summary or in the abstract.

BRIEF DESCRIPTION

In the following drawings like reference numbers are used to refer to like elements. Although the following figures depict various examples of the invention, the invention is not limited to the examples depicted in the figures.

FIG. 2 shows an example of a screenshot of a subject specific sign-on page.

FIGS. 3-5 show examples of pages for editing sentences having voice recognition errors prior to correcting the errors.

FIGS. 6 and 7 show examples of screenshots of pages for correcting voice recognition error.

(3)—DETAILED DESCRIPTION OF THE INVENTION

Figure 1:
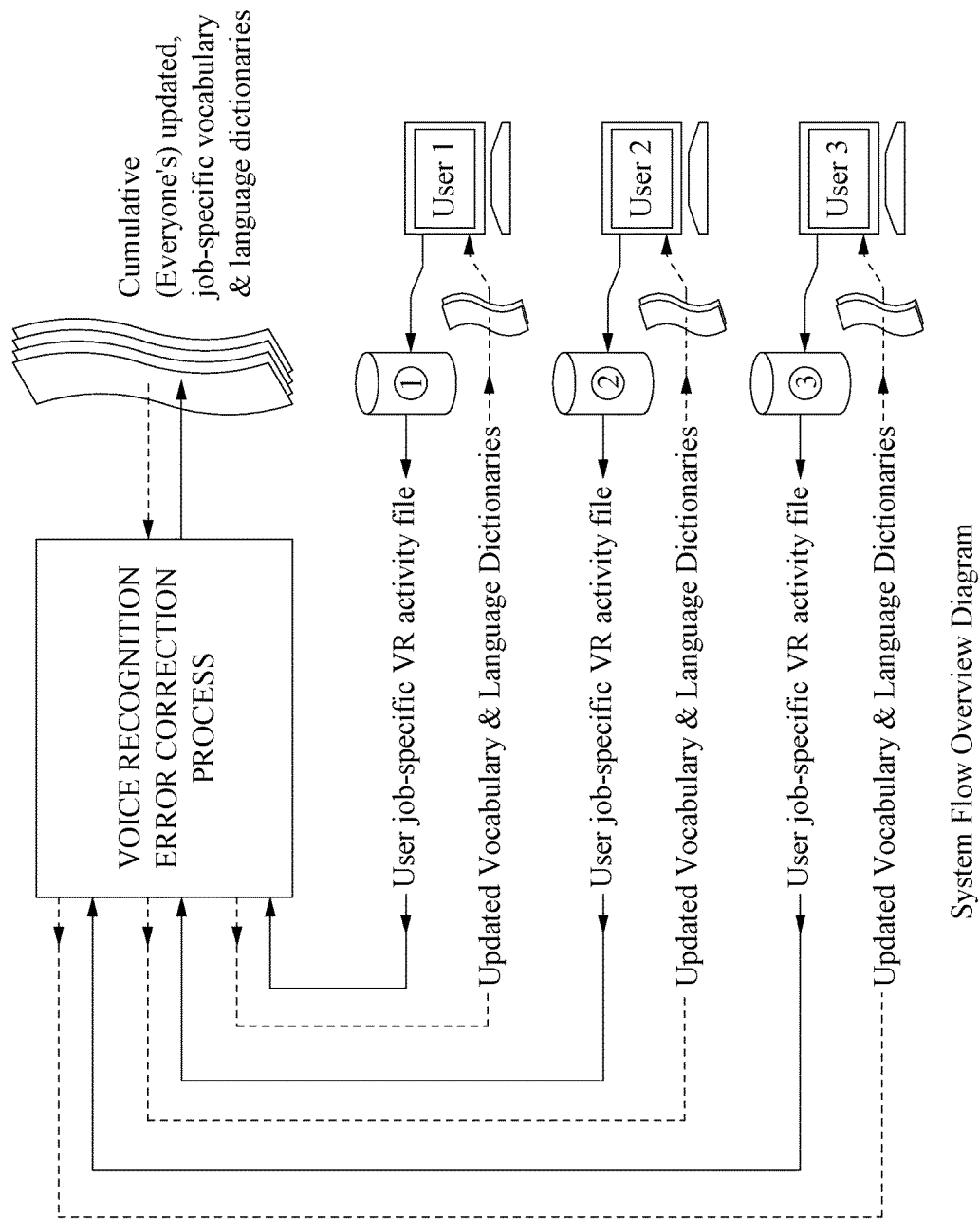
FIG. 1 shows an example of a flow diagram of method of carried out by a voice recognition system.

Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

3.1—Background:

Voice recognition software enables the capability to recognize spoken words in a sentence and transform the spoken words into digital text words, utilizing the vocabulary dictionary, and the language dictionary, as follows:

3.1.1—The Vocabulary Dictionary:

Voice recognition software analyzes the acoustic pronunciation of a spoken word in a sentence and attempts to match the spoken word pronunciation to one of the many acoustic pronunciations of the word, (e.g., by performing a search for the acoustic pronunciation recorded). The acoustic pronunciations stored are associated with predefined spellings of the written text word, which is located in the voice recognition vocabulary dictionary (see: 2.1 and 2.3, above). The greater the number of different acoustic pronunciations of the same word, the better the probability of locating the written text word associated with the different pronunciations of the specific text (i.e. written) spelling of the word.

The Vocabulary Dictionary can be created and/or augmented by the cumulative input of the acoustic pronunciations of all the previously stored spoken words (i.e. the corresponding user spoken word acoustics and the correct digital text spelling of the words) that have been correctly recognized by the voice recognition software.

3.1.2—The Language Dictionary:

The language dictionary (see: 2.1 and 2.3, above) contains the digital text (written) words of spoken sentences, and the acoustics of each individual word, as influenced by both the previous and following word in the sentence. In "continuous speech" (regular talking without pauses between each word), the acoustic properties of each spoken word are influenced by the acoustics of both the previous and following words, as spoken in the sentence.

The purpose of the language dictionary is to help build the vocabulary dictionary in order to enable voice recognition software to analyze the acoustics of the spoken word in the vocabulary dictionary, as detailed above, The idea is that the language dictionary may contain sentences with the same "previous" and "subsequent" words, in order to definitively match said spoken word in the vocabulary dictionary (as detailed above) with the known acoustics of a specific text (i.e. written) spelling of the word in said vocabulary dictionary.

The vocabulary dictionary may be constructed (in whole or in part) by extracting the acoustics of spoken words in the language module associated with the correct digital text of said word from the language dictionary.

3.1.3.—Voice Recognition Errors

Voice recognition errors occur when the acoustics of the spoken word do not definitively match the acoustics of words in the vocabulary dictionary, with the assistance of the library dictionary, as described above (See 3.1.1 and: 3.1.2).

3.2—The "Subject-Specific" Voice Recognition Environment

FIG. 1 shows an example of a flow diagram of method of carried out by a voice recognition system.

3.2.1—The Problem:

The problem is that today most voice recognition products are "general purpose", (not subject-specific) meaning that product users can talk about any and every subject (i.e. there is no norm or repetitive words and sentences). This significantly reduces the probability of voice recognition finding and matching an acoustical pronunciation of a word that is associated with the written text of the word (Located in the Voice Recognition software's Vocabulary and Language Dictionaries).

3.2.2—Subject-Specific Approach:

The term "subject-specific" simply means related to the same subject, and when applied to conversations means all statements come from conversations about the same subject (e.g., the same industry or government job-specific function) the meaning of words become more clear and precise. It is the norm that the same and similar sentences and phrases are used repetitively on a regular basis, which increases the likelihood that the voice recognition is performed correctly.

It is the inherent nature of all large vertical business and government agencies to be broken down into smaller specific functional or task specific units or areas (e.g., departments). In this specification, the terms vertical business and vertical industry are used interchangeably—one term may be substituted for the other where ever either occurs to obtain different embodiments. The voice recognition technology of this system, works on this department specific level, because people in the same field and/or having the same or similar jobs tend to use the same words, and the same sentences, (including job-specific terminology and jargon) repeatedly, over and over, in the course of performing their specific job related task.

3.2.3—Separate Subject-Specific Voice Recognition Products, Each Individual Product Relating to One Specific Vertical Industry, Profession or Government Agency:

Each vertical industry company, each profession, and each government agency in the system is given a separate and unique subject-specific "Voice Recognition Product".

Each said vertical industry or government agency voice recognition product will be modified, to utilize the specific multiple "pairs" of vocabulary and language dictionaries, each said pair corresponding to particular individual subject-specific department level related task or "job-specific" function directly relating the specific individual user (worker, employee) who signs-on to the product during the initiation of a voice recognition session.

FIG. 2 shows an example of a screenshot of a subject specific sign-on page.

Each said subject-specific voice recognition product, corresponding to a particular abovementioned vertical industry, profession or government agency, will have a "drop-down-box" and/or other pick list (or other method known to those skilled in the art) containing the names of all individual department level related tasks or "job-specific" functions in the vertical industry or government agency which will appear during the voice recognition session sign-on process.

During the above mentioned voice recognition session sign-on process, the user(s) may choose from, or have as an optional default, or a required default, from the picklist their individual subject-specific department level related task or "job-specific" function.

It should be hereafter understood, unless specified otherwise, that when the terms vocabulary dictionary and language dictionary, as used hereinafter, below, what is being referred to is an individual subject-specific (e.g., job-function specific) is a vocabulary dictionary or language dictionary belonging to a "language dictionary and vocabulary dictionary pair" corresponding to an individual subject-specific department level related task or "job-specific" function, within a separate subject-specific voice recognition product. Each product associated with the pair relates to one specific vertical industry, profession, or government agency, or other subject-specific entity.

3.2.4—Modifications to the Source Code of the Voice Recognition Software Program for Audio Recording.

3.2.4.1—Recording by Voice Recognition Software of Each Recognized Word or Voice Recognition Error From the precise point that voice recognition software recognizes a specific spoken word in a sentence, or in Continuous Unedited Speech, the spoken word, which the voice recognition software may attempt to match to the acoustics of the word in the vocabulary module, the speaker's acoustic pronunciation of the word, is recorded (e.g., by a high definition digital audio recorder). The recording may be enhanced by use of the Speech Enhancement technology. The recording may continue until the point at which the voice recognition software has determined whether the acoustic properties of the word can be definitively recognized or cannot be definitively recognized (i.e., a VR Error has occurred).

3.2.4.2—Recording by Voice Recognition Software of the Entire Voice Recognition Session.

In addition to the above (see: 3.2.4.1), the entire voice recognition session is recorded by a high definition digital audio recorder. The recording may be enhanced by use of Speech Enhancement technology, and the recording of the words spoken (e.g., of all of the words) from the initiation of the voice recognition session until the termination of the voice recognition session.

3.3—Voice Recognition Session/Sentence/Word Processing Modifications:

3.3.1—New Voice Recognition Session:

In an embodiment, from the precise point that voice recognition software initiates (e.g., starts) a new voice recognition session, a method to extract specified information from executing programs during runtime of the executing programs, an Application Program Interface (API) (e.g., a graphical user interface and/or a voice activated interface) is initiated, hereafter known as "ITEM#1". "ITEM#1" extracts or generates/computes data items, which are referenced by numbers 1-14, and are listed below.

Each session may have any number of data item associated with the session. In the example that follows here are at least 28 data items. Each of the 28 data items may be fields of the function calls and/or function returns of the API. Some of the 28 data items may be input by and/or viewed by the user by the UI. The source of each of the data items (1-14 and 25-28) may be extracted or generated/computed, as detailed below, as the "source" of each said individual data item. Data items 15-24 are formatted as indicated hereafter for each of the data items and is left null (i.e. without data information).

1—Name of a subject-specific voice recognition product.
The product relates to one specific vertical industry or government agency, for example.
Source: the name of the product may be embedded in the code for the voice recognition software product and/or stored in a memory location associated with the voice recognition software product and retrieved by the voice recognition software product, or written in a product license agreement, and then manually entered (e.g., manually input to field and/or a table of a computer application and stored for subsequent retrieval). The term "table" refers to a database table, such as a RDB table. The term "database table" is used interchangeably with the term "database object" or just "object." Any of the terms table, database table, object, and database object may be substituted one for another wherever any of these terms appear to obtain different embodiments.

2—Unique Voice Recognition Session Identification Number
Source: One of several random number algorithms or methods, known to those skilled in the art. In other words, the session identification may be generated by a random number generator that is invoked by the voice recognition software product.

3—Unique user entity license identification
Enterprises and individuals may have separate types of license identification numbers.
Source: the unique user entity license identification may be embedded in the voice recognition software product or stored in a storage location associated with the voice recognition software product and retrieved by the voice recognition software product from that storage location or the from the software, or written in a product license agreement, and then manually entered into the UI of the voice recognition software product (e.g., manually input to computer application table and stored for subsequent retrieval).

4—User Name of Speaker in Voice Recognition Session
Source: User Profile In other words, the voice recognition software product may retrieve the user name from a user profile. The user profile may be established at the time of purchase and/or the initial usage of the product.

5—User ID of Speaker in Voice Recognition Session
Source: User Profile. In other words, the voice recognition software product may retrieve the user name from a user profile. In an embodiment, the User ID is unique. In an embodiment, since the User name uniquely identifies the user, the user name is optional.

6—Company Identification (If Enterprise License)
Source: The company identification may be embedded in the voice recognition software product or stored in a storage location associated with the voice recognition software product and retrieved by the UI from that storage location or from the software, or written in the product license agreement, and then manually entered (e.g. manually input to computer application table and stored for subsequent retrieval).

7—Company Name (If Enterprise License)
Source: the company name may be embedded in the voice recognition software product or stored in a storage location associated with the voice recognition software product and retrieved by the UI from that storage location or from the software, or written in the product license agreement, and then manually entered (e.g., manually input into a computer application table and stored for subsequent retrieval).

8—Chosen Subject-Specific Topic (i.e., Vertical Industry, Profession, or Government Agency—Job Function)
Source: The chosen subject specific topic may be chosen by the user from a pick list or table or may be a user restricted default that is determined prior to a Voice Recognition Session, as detailed below.

9—Computer ID used for VR session
Source: Self Explanatory—an identifier of a computer such as a machine address, IP address and/or manufacturer assigned identifier of the computer, which may be retrieved by the voice recognition software product. Different computers may have different microphones, which may change the way the user sounds, and may thereby affect the voice recognition.

10—Geographical Location (e.g. Country, State) of VR Session.
Source: The geographical location may be retrieved by the voice recognition software product from the User Profile or IP Address 11—Specific computer application for which VR has been initiated (e.g., E-Mail, Word Processing, etc)
Source: Programming technique, known to those skilled in the art.

12—User E-Mail Address (Part of the initial User Profile setup)
  Source: The e-mail address may be retrieved by the voice recognition software product from User Profile.
13—User's Telephone Number (Part of the initial User Profile setup)
  Source: The telephone number may be retrieved by the voice recognition software product from User Profile
14—GMT Date & Time of start of VR Session by GMT mm.dd.yyyy. (at. hh (00-24) mm (00-59). ss (00-59)
  Source: Programming technique, known to those skilled in the art. The GMT date and time may be computed by the voice recognition software product from the local time and location, which may be computed by the computer running the voice recognition product. As time passes, different terms become more popular and less popular and the user's voice and/or accent may change. In this specification, although GMT time is referred to in many locations, any time that is mutually agreed to by all users may be substituted.
15—Session VR Error Corrections Requested to be completed by GMT mm.dd.yyyy (at. hh (00-24).mm (01-59)
16—Request that the voice recognition error-correction work relating to said voice recognition session be done by a third party contractor (e.g., voice recognition software vendor)=(YES/NO). If the YES option is selected, the third party contractor may also be specified.
17—GMT Date & Time of last VR Error-Correction for VR Session
18—GMT Date & Time of VR Error-Correction Completion for entire VR Session
19—User ID of VR error-correction individual (e.g., post editor) who completed VR error-correction for the entire VR session.
20—Total Number of Sentences in The Voice Recognition Session
  Source: Derived by counting the total number of executions of "ITEM#4" (see: 3.3.4, below), which the UI determines based on the end of each "edited structured speech" sentence in a voice recognition session (for example, the UI may count the number of sentences by counting the ends of the sentences).
  In an embodiment, the case of "continuous unedited text" this "total number of sentences in the voice recognition session" will contain an initial value of zero.
21—Total Number of Voice Recognition Errors in the Voice Recognition Session
  Source: Examining the results of each execution of ITEM#3 (see: 3.3.3, #3, below), and in the case that the system determined that a word in a sentence or continuous unedited speech is a "voice recognition error", then the count of the total number of said "voice recognition error" words in the voice recognition session is incremented, until all sentences or continuous unedited speech in the voice recognition session have been processed, as determined by ITEM#5 (see: 3.3.6, below).
22—Vocabulary Dictionary (see: data item #8, above) update completion (GMT Date & Time mm.dd.yyyy. hh.mm.ss) for this voice recognition session.
23—Language Dictionary (see: data item #8, above) update completion (GMT Date & Time mm.dd.yyyy. hh.mm.ss) for this voice recognition session.
24—Mini-Local Vocabulary Dictionary: (see data item #8 above, and see: 3.6.3 below) update completion (GMT Date & Time mm.dd.yyyy.hh.mm.ss) for this voice recognition session.
25—"Speaker-Dependent mode" (or) "Speaker-Independent mode"—Indicator
  Source: User Profile or the mode may be chosen by the user at the beginning of the session. The mode may be chosen manually. Alternatively, the mode may be chosen automatically, based on the type of session. Alternatively, there may be a mixed mode in which certain parts of the session are automatically identified as using the speaker dependent mode and as using the speaker independent mode.
26—"Edited Structured Speech" (or) "Continuous Unedited Speech" Indicator Source: Determined by the "Mode" in which the voice recognition program is run, as determined by the user. The mode may be chosen manually. Alternatively, the mode may be chosen automatically, based on the type of session. Alternatively, there may be a mixed mode in which certain parts of the session are automatically identified as speaker dependent mode and speaker independent mode. For example, a voice activated navigation session may automatically use the edited structure speech, a conversation may automatically use a continuous unedited speech mode and a dictation session may automatically switch between modes depending on whether the user is dictating or issuing a command.
27—"Meeting Stenographer" Indicator
  Source: Requested by user prior to Voice Recognition Session
28—Any other VR session ID information, as may be required.
3.3.2—Left Blank
3.3.3—Recording Each Word within the Sentence (or) within Continuous Unedited Speech
At the precise point that voice recognition software recognizes a specific spoken word in a sentence, or in continuous unedited speech, the spoken word, which the voice recognition software attempts to match to acoustics of said word in the vocabulary module, the voice recognition software is initiated, hereafter referred to as "ITEM#3." The speaker's acoustic pronunciation of the word, is recorded (e.g., by a high definition digital audio recorder). The recording is enhanced by use of the speech enhancement technology. A search is conducted based on the enhanced recording for the acoustic pronunciation of the word until the point at which the voice recognition software has determined whether the acoustic properties of the word can be definitively recognized or cannot be definitively recognized (i.e., if the acoustic pronunciation of the word cannot be definitively recognized, a VR error has occurred).
"ITEM#3" will initiate a computer program which will extract the following information derived from data processed by the voice recognition software as follows:
1—Text spelling of the recognized word—or a Null is entered, in the case of a VR error.
2—High definition digital recording of the individual word, as spoken by the user, and enhanced by speech enhancement technology
3—Word VR error indicator: (1. NO=Not Voice Recognition Error, as determined by ITEM#3 (above) 2. YES=Voice Recognition Error as determined by ITEM#3 (above). 3. OK=Subsequently Corrected VR Error associated with an existing text word in the vocabulary dictionary. This "OK" indicator is updated in the RDB (below) and is a result of the functionality of the "Voice Recognition Error—Error Correction Screen" (see: 3.11, below). 4. NEW WORD=Subsequently Corrected VR Error without association to any existing text word in the vocabulary dictionary. This "NEW WORD" indicator is updated in the RDB (below) and is a result of the functionality of the "Voice Recognition Error—Error Correction Screen" (see: 3.11, below). FIG. 3 shows an example of a screenshot of a page for correcting voice recognition errors.

4—Word number corresponding to the sequential order of the specific word within the order of words as said words appear in the Sentence or the order of words as said words appear in the Continuous Unedited Speech.

Individual words in the sentence are extracted, as detailed in 3.3.3 (above), in multiple iterations (multiple executions of "ITEM#3"), starting sequentially from the first word in the sentence or Continuous Unedited Speech, and continuing with the next following next word, until the last word in the sentence has been processed, as detailed in 3.3.4 (below). In this manner, the computer is enabled to generate and assign each word in a sentence with a sequential word number, according to the sequential order in which each word appears in a sentence or in the Continuous Unedited Speech.

The results of each single execution of "ITEM#3", as detailed above (i.e., data items 1 through 4, above), are sequentially stored (one after the other) in computer storage and will be used for the generation of a single VR "Session File record, as detailed below (see: 3.4.2).

3.3.4—End of the Sentence:

As opposed to Voice Recognition Transcription which produces Continuous Unedited Text, Voice Recognition Dictation systems provide a provides a User Editor Interface which enables the user to produce Structured Edited Text including sentences (starting with a capital letter), grammatical punctuation within sentences, periods at the end of sentences, separate paragraphs, as well as other document formatting.

When processing Structured Edited Text (see: 3.3.1, data item #26 above), at the precise point that voice recognition software encounters the period at the end of a sentence, a User Interface (UI) will be initiated, hereafter known as "ITEM#4."

"ITEM#4" will initiate a computer program which will extract the following information derived from data processed by the Voice Recognition Software as follows:

1—End of Sentence Indicator (corresponding to a period at the end of the last word of a sentence).

3.3.5—Some Feature of the "the Meeting Stenographer" Facility

Continuous Unedited Speech can be used to create "Transcripts" of what a single individual said during a voice recognition session.

In the present invention, there is a feature described herein and below known as "The Meeting Stenographer" (hereafter "Meeting") which enables a single voice recognition session with "Multiple Speakers". "The Meeting Stenographer" is conducted in Continuous Unedited Speech Mode ((see: 3.3.3, data item #24).

In such a transcript containing multiple speakers, an indication is added indicating who is talking. The digital text of each speakers' name or some other indication of which speaker is talking may precede the digital text detailing what each speaker said.

As part of the setup process prior to each single voice recognition session with multiple speakers, the name, title and function of each voice recognition participant may be recorded into a computer setup screen, and each meeting participant (e.g., each speaker) may be requested and/or given the option to read and pronounce a number of sample prewritten sentences (e.g., voice sample(s)) into the computer microphone for the purpose of recognizing each speaker.

The Meeting Stenographer/Talking-in-Turn

From the precise point that voice recognition software initiates (i.e. starts) a new voice recognition session, the speaker recognition software is utilized concurrently with the voice recognition software throughout the voice recognition session.

In an embodiment, the meeting stenographer feature (which is a single voice recognition session with "multiple participants"), does "not allow" more than one speaker to talk at any one time. Meeting participants are required to talk-in-turn. When any two or more speakers begin to talk concurrently (e.g., interrupt each other), in an embodiment, the present system will "just stop" and issue an "audio alarm". In an embodiment, in the case of people speaking concurrently, the meeting "administrator" (e.g., the system user who initiated the meeting) will decide, and indicate to the system, which participant has the right to talk next.

The case in which multiple participants talk "at the same time" (e.g., interrupt each other) is determined when (1)—At the point that a voice recognition error occurs—and—(2)—the whole or part of the audio recording of said voice recognition error "cannot be recognized by speaker recognition technology as a "meeting participant", using said voice samples (see: 3.3.5, above) from each participant in the specific voice recognition meeting.

The Meeting Stenographer/Determining "Who Said What"

The processing required which enables the meeting facility to determine which of the multiple meeting participants spoke "each word" during each the meeting facility voice recognition session is detailed in 3.11.1, item #0.3 below.

3.3.6—End of the Voice Recognition Session:

At the precise point that voice recognition has completed and/or has determined that the voice recognition session has been completed (i.e., after the last sentence of the voice recognition session has been processed), the voice recognition software will generate an "End of Voice Recognition Session indicator" and a User Interface (UI) will be initiated, hereafter known as "ITEM#5."

"ITEM#5" will initiate a computer program that will extract the following information derived from data processed by the Voice Recognition Software as follows:

1—The "End of Voice Recognition Session Indicator" (The Voice Recognition Session has terminated).

3.3.7—"Word Recording Timer Boundaries"

Audio recording of the entire voice recognition session (from beginning to end) and the creation of "Word Recording Timer Boundaries" for utterances (e.g., words or voice recognition errors) encountered during a voice recognition session. The "Word Recording Timer Boundaries" are the beginning and end of an utterance.

3.3.7.1—Extraction of Audio "Word Recording Timer Boundaries" (Beginning & End of each audio said utterance, being either a recognized word or voice recognition error), see 3.3.3, above.

A Precise Timer is initiated together with (In-Sync with) an audio recording that is initiated at the very beginning of each Voice Recognition Session processing to create "Time/Word Boundaries" (the times of the beginnings and ends of a word) for every utterance (i.e., recognized word or voice recognition error) spoken during a voice recognition session.

1—An enhanced high definition audio recording of the Voice Recognition Session is initiated to digitally record the audio of the Voice Recognition Session immediately from the beginning until the completion of said Voice Recognition Session.

2—A clock "Timer" (i.e. hours, minutes, and second units (e.g. Milliseconds or less—e.g. hh.mm.ssss), is initiated immediately from the beginning (of the above mentioned high definition digital recording of a voice recognition session until the completion of said Voice Recognition Session. In an embodiment, the "Timer" is synchronized with the above mentioned high definition audio recording. In an embodiment, the clock of the "Timer" is highly accurate and precise. In an embodiment the clock of the "Timer" is accurate to within a second. In an embodiment the clock of the "Timer" is accurate to within a tenth of a second. In an embodiment the clock of the "Timer" is accurate to within a hundredth of a second. In an embodiment the clock of the "Timer" is accurate to within a millisecond. In an embodiment the clock of the "Timer" is accurate to within a microsecond.

3—At the point that Voice Recognition encounters the beginning of an utterance (e.g., at the start of a word or a voice recognition error), to be processed by voice recognition software, the time (e.g. hh.mm.ssss) of the encounter is extracted from the Timer utilizing techniques known to those skilled in the art. The extracted time (which may be referred to as the "Utterance Beginning Timer Boundary") of the beginning of encountering an utterance is stored in the associated Word Record (see section 3.4.2 for a description of some embodiments of the Word Record) of the VR Session File (see section 3.4 for a description of some embodiments of the VR Session File).

4—At the point that Voice Recognition encounters the end an utterance (e.g., a word or a voice recognition error), to be processed by voice recognition software, the time (e.g. hh.mm.ssss) of the encounter is extracted from the Timer. The extracted time (which may be referred to as the "Utterance End Timer Boundary") of the end of said utterance encounter is stored in the associated Word Record (i.e. 3.4.2) of the VR Session File (e.g., see 3.4).

3.3.7.2—Together, the "Utterance Beginning Timer Boundary" and the "Utterance End Timer Boundary" of either a recognized word or voice recognition error, will hereafter also be known as the "Recorded Utterance Timer Boundaries". By storing the beginning time and the end time of the utterance, a search may be performed for the beginning and the end of the utterance and then the system may play back that section, which thereby enables the audio playback of a word or voice recognition error from/to any time location within the audio recording of the voice recognition session, as well as any continuing playback of the audio thereafter.

Furthermore, special purpose "Utterance End Timer Boundaries" specifically indicating (or pertaining to) the end of sentences, the end of paragraphs (or other types of subdivisions of speech), can be created by using the "Utterance End Timer Boundary" of a specific word as the demarcation of other subdivisions of the speech). The creation of the special purpose "Utterance End Timer Boundaries" may be programmed into the Post Editing Process (e.g., see 3.9-3.11, below) and performed in accordance with the human post editor working with text and manually defining sentences and paragraphs.

In addition, the "Utterance End Timer Boundaries" can be used to facilitate program functions that play the entire audio recording of the voice recognition session, while indicating (e.g. highlighting) on the display screen the specific word that is currently being pronounced (e.g., the audio section currently being played), which may be played in the original voice of the user as spoken during the voice recognition session, on the audio recording of the voice recognition session being played.

special purpose 'Recorded Utterance Timer Boundaries' (located in the VR Session Word Record (see: 3.4.2, below) may be placed into the appropriate corresponding RDB Word Record, as detailed below, as part of a digital update, to facilitate identifying the subdivisions of the speech.

Any place in this specification that discusses the user hearing a word or words that are displayed on the screen, it should be understood that the user may hear the word(s) being uttered while watching the word(s) the highlighting on the screen (or other indicator) indicating which word is currently being pronounced. The correlation of the location to highlight and the section of the recording being played may be synchronized using association of the sections of the recording and the Recorded Utterance Timer Boundaries in the RDB table. Optionally, when playing speech that is divided into the subdivisions indicated by the special purpose Recorded Utterance Timer Boundaries, an indicator may appear indicating which subdivision (e.g., which paragraph) is currently being read in addition to, or instead of, the indicator indicating the word or utterance being read. Furthermore, the existing audio that is between "Recorded Utterance Timer Boundaries" may be played while the area on the display having the corresponding text is highlighted. What is actually played is the entire section of the audio recording (or optionally, the entire audio recording as indicated above), including the spaces between the timer boundaries (e.g., including both the spaces between the start and end of a word/utterance as well as spaces between the end of one word/utterance the beginning of the next word/utterance). In this manner (that is, by playing both the utterances/words and the audio between the utterances/sounds), what is actually played is a full true to life recording of the voice recognition session.

detailed in section 3.10, below, voice recognition errors may contain two or more words (and/or may contain one or more partial words or other utterances that are not words, at all, such as a grunt or laugh). The method described in 3.10, below facilitates enabling the Audio Editor to slow down the audio recording and to use the screen and audio to cut (e.g., separate) multiple (e.g., three) words within a voice recognition error into separate words. In the method or 3.10, multiple (e.g. three) word records are created in the RDB (instead of the one Word Record containing the voice recognition error), and the correct respective "Utterance Beginning Timer Boundary" and "Utterance End Timer Boundary" are placed in new separate RDB Word Records, as detailed below.

3.4—The VR Session File:

The VR "session file" contains information (e.g., metadata) relating to particular voice recognition user's voice spoken words and sentences during each and every specific voice recognition session initiated by the user, whether the words spoken are dictation of a structured edited document, and/or voice recognition of a particular user(s) speaking words and sentences for the purpose of transcription, or other application of voice recognition technology.

The description below of the file record type field level data formats, and the information contained in the description below of the file records, (see: 3.4.1 through 3.4.4) are derived as detailed in the above "Voice Recognition Session/Sentence/Word Processing Modifications" (See: 3.3 through 3.3.6 above).

In an embodiment, there may be a word table (having records corresponding to words), a sentence table (having records corresponding to sentences), and a session table (having records corresponding to sessions). The session records may include information identifying each session, such as how many sentences and optionally words are in the session, the time of the session, the date of the session, the participants of the subject and/or purpose of the session. The sentence records may include information about the sentences, which session the sentence belongs to, how many words are in the session, an indicator as to where sentence belong is the session (e.g., a numerical value, such as 2 to indicate that the sentence is the second sentence in the session), and the speaker of the sentence. The word records may include information about the word, such as what sentence the word belong to.

3.4.1—The VR Session File Header Record
Containing data items as follows:
(1)—The VR "session file header record" contains a single "header record" at the beginning of the file, which provides information about items and/or data of the specific VR session as detailed in 3.3.1 (above).
(2)—In the case that the voice recognition session mode is "continuous unedited speech" as determined by 3.3.1, data item #26, above, the header record contains: A recording of all words in the voice recognition session, as spoken by the single user or multiple users (see: 3.3.5, above) during the entire voice recognition session, and the corresponding digital text of the words as spoken by the user, as detailed in 3.3.2 (above).

3.4.2—The VR Session Word Record
In an embodiment, there is a single VR Session Word Record generated for each utterance (i.e. recognized word or voice recognition error) in a voice recognition session in which the records are generated, in the order in which the utterances occur in the voice recognition session.

1—Information regarding each word in the Sentence or Continuous Unedited Speech as detailed in 3.3.3 (above) including:
2—Digital text spelling of Recognized Word—(or) Null, in the case of a VR Error.
3—High definition digital audio recording of the individual word, as spoken by the user and enhanced by Speech Enhancement technology.
4—Word VR Error Indicator: (1. NO=Not Voice Recognition Error, as determined by ITEM#3 (above) 2. YES=Voice Recognition Error as determined by ITEM#3 (above). 3. OK=Subsequently Corrected VR Error associated with an existing text word in the vocabulary dictionary. This "OK" indicator is updated in the RDB (below) and is a result of the functionality of the "Voice Recognition Error—Error Correction Screen" (see: 3.11, below). 4. NEW WORD=Subsequently Corrected VR Error without association to any existing text word in the vocabulary dictionary. This "NEW WORD" indicator is updated in the RDB (below) and is a result of the functionality of the "Voice Recognition Error—Error Correction Screen" (see: 3.11, below)
5—Word number corresponding to the sequential order of each specific word as it appears within either the Sentence or within the Continuous Unedited Speech words that are subsequently broken down to form individual sentences (see: 3.10.2, below)
6—GMT Time & Date beginning of word was spoken during this voice recognition session in format: mm.dd.yyyy at hh (00-24).mm (01-59) at ss: (01-59)
7—End of sentence Indicator as detailed in 3.3.4 (above) including:
  7.1—In the case of edited structured speech: (see: 3.3.1, data item #26 above), and if the word contained in this record is the last word of a sentence (see: 3.3.4, above), an end-of-sentence-indicator is placed in the record (the end-of-sentence-indicator may be identified and/or created by a special purpose "Utterance End Timer Boundaries").
  7.2—In the case of continuous unedited text, the VR session file does not have the end of sentence indicator corresponding to a period at the end of the last word of a sentence. At the point of last word of a sentence, as subsequently corrected and defined, as detailed in "Editing Voice Recognition Errors" (see: 3.10.1 and 3.10.1.1, and Sentence Editing, see: 3.10.2, below), an "End of Sentence" Indicator may be placed in the VR Session Word Record (see: 3.4.2) corresponding to said last word of said sentence.
8—"Recorded Utterance Timer Boundaries"
  (i.e., said utterance being a word or voice recognition error).
The following is a list of the parameters of an embodiment of the Recorded Utterance Timer Boundaries, and the source form which the values of the parameters may be derived.
  8.1—"Utterance (Word) Beginning Timer Boundary"—Source 3.3.7
    (i.e., Timer position on audio recording; hh.mm.ssss)
    (i.e., Timer position on audio recording; hh.mm.ssss)
  8.1.1—"Utterance (Word) End Timer Boundary"—Source 3.3.7
    (i.e., Timer position on audio recording; hh.mm.ssss)
  8.2—Sentence Beginning Timer Boundary—Initially Null
    (i.e., located in first Word Record of Sentence)
    (i.e., Timer position on audio recording; hh.mm.ssss)
  In other words, the Sentence Beginning Timer Boundary may be a special purpose Utterance Beginning Time boundary, which may part of a special purpose, Recorded Utterance Timer Boundaries, and which may be located in the first Word Record of the Sentence. The content of the Sentence Beginning Timer Boundary may include the timer position on the audio recording at the beginning of the first word of the sentence.
  8.2.1—Sentence End Timer Boundary—Initially Null
    (e.g., located in last Word Record of Sentence)
    (e.g., Timer position on audio recording; hh.mm.ssss)
  In other words, the Sentence End Timer Boundary may be a special purpose Utterance End Time boundary, which may part of a special purpose, Recorded Utterance Timer Boundaries, and which may be located in the last Word Record of the Sentence. The content of the Sentence End Timer Boundary may include the timer position on the audio recording at the end of the last word of the sentence.

8.3—Paragraph Beginning Timer Boundary—Initially Null
   (i.e., located in first Word Record of Paragraph)
   (i.e., Timer position on audio recording; hh.mm.ssss)

In other words, the Paragraph Beginning Timer Boundary may be a special purpose Utterance Beginning Time boundary, which may part of a special purpose Recorded Utterance Timer Boundaries, and which may be located in the first Word Record of the Paragraph. The content of the Paragraph Beginning Timer Boundary may include the timer position on the audio recording at the beginning of the first word of the paragraph.

8.3.1—Paragraph End Timer Boundary—Initially Null
   (i.e., located in last Word Record of Paragraph)
   (i.e., Timer position on audio recording; hh.mm.ssss)

In other words, the Paragraph End Timer Boundary may be a special purpose Utterance End Time boundary, which may part of a special purpose Recorded Utterance Timer Boundaries, and which may be located in the last Word Record of the Paragraph. The content of the paragraph End Timer Boundary may include the timer position on the audio recording at the end of the last word of the paragraph.

3.4.3—The Speaker Identification Record

The speaker identification may include,
1—Name of Speaker
2—Title (e.g. Lawyer)
3—Function (Defense Counsel)
4—Speech Sample (For use by Speaker Recognition technology)

The speaker identification may be stored in a table of information about speakers. Each record in the table of speaker information may include a speaker identifier and each of the records in the VR session word records includes an identifier of the speaker, and when presenting a view showing information about the word, the information about the speaker may be joined with the information about the word, so that the viewer can see more information about the word. Alternatively, the information about the speaker may be included in the VR session word record.

Note: the speaker identification record (3.4.3) may be utilized exclusively for and during the system's meeting stenographer feature, described in the section entitled, "Speaker Recognition" (see: 3.3.5, above).

3.4.4—The "VR Session File Trailer Record"
1—Indicating The End of the Voice Recognition Session, as detailed in 3.3.6 (above).
2—A high definition digital Audio Recording of the entire Voice Recognition Session.

3.5—Left Blank 3.6—the Global Multi-Entity VR Multi-Session Relational Data Base The above information may be extracted during each users' voice recognition sessions, is accumulated and utilized by a product computer program, located within each user's computing device, to generate sequential computer records comprising a sequential file, which may be the VR session file (see: 3.4). After the VR session file is created, the VR session file may then be transmitted to a remote off-site RDB, such as, "the global multi-entity VR multi-session relational data base," which may contain the above information recording each and every user's use of the system during and across all subject-specific voice recognition sessions conducted by every user of the voice recognition system on an ongoing cumulative basis.

The remote off-site RDB may be referred to as (1)—The Global Multi-Entity VR Multi-Session Relational Data Base, (2)—Global Multi-Entity VR Multi-Session Relational Data Base, (2)—RDB, (3)—Relational Data Base. In this specification, the terms, (1)—The Global Multi-Entity VR Multi-Session Relational Data Base, (2)—Global Multi-Entity VR Multi-Session Relational Data Base, (2)—RDB, (3)—Relational Data Base are used interchangeably.

The Relational Data Base (RDB) is utilized to store the VR session file(s) (see: 3.4, above), where the VR session file may be stored for each and every user of the system on an ongoing cumulative basis.

The RDB may be the source of information for the system's voice recognition session error correction process for all voice recognition sessions conducted by or on behalf of each and every user of the system (by a third party), and the RDB may updated by all error corrections made during the error correction process.

Each post error correction process voice recognition session may be stored in the RDB and then utilized to update the respective subject-specific language dictionary and vocabulary dictionary.

The RDB is also used to facilitate features of the system, including, but not limited to:
1—The Archive (see: below)
2—"The Meeting Stenographer" (see: below)

As with all Relational Data Base technology, the RDB "access keys" can be utilized individually, or in concert using AND/OR Boolean access key relationships, providing flexible and comprehensive access to the records of the RDB.

All field level data items may be utilized as access Keys and all data item fields created, accessed, and updated as enabled by relational data base technology 3.6.1—the Global Multi-Entity Vocabulary Dictionary The global multi-entity vocabulary dictionary is a vocabulary dictionary (see: 3.1.1, above) that may contain comprehensive data from all voice recognition sessions conducted by all global multi-entity licensees, for a particular subject-specific (e.g., job-specific) function within a vertical industry, profession or government agency voice recognition product (see: 3.2.3, above) on an ongoing cumulative basis. There may be multiple global multi-entity vocabulary dictionaries (see: 2.1 and 2.3, above), one for each subject-specific (e.g., job-specific) function within each vertical industry, profession, or government agency voice recognition product (see: 3.2.3, above).

The global multi-entity vocabulary dictionary may be referred to as (1)—Global Multi-Entity Vocabulary Dictionary, (2)—The Global Multi-Entity Vocabulary Dictionary, (3)—Vocabulary Dictionary, (4)—The Vocabulary Dictionary. Each of the terms (1)—Global Multi-Entity Vocabulary Dictionary, (2)—The Global Multi-Entity Vocabulary Dictionary, (3)—Vocabulary Dictionary, (4)—The Vocabulary Dictionary are used interchangeable in this specification.

It should be hereafter understood, unless otherwise specifically mentioned, that when the terms vocabulary dictionary, language dictionary, as used hereinafter below, what is being referred to is an individual subject-specific (e.g., job-function specific) vocabulary dictionary or language dictionary belonging to a "language and vocabulary dictionary pair" corresponding to an individual subject-specific department level related task or "job-specific" function, within a separate subject-specific voice recognition product. Each of the products relates to one specific vertical industry, profession or government agency or other subject-specific entity, as mentioned above.

Each of the vocabulary dictionary and language dictionary pair corresponds to a particular individual subject-specific department level related task or "job-specific function" and is a "remote entity" used by all users of the particular voice recognition product (above), with each specific user of the product accessing and utilizing the one "remote entity" "vocabulary and language dictionary pair" relating to the individual user's job-specific (e.g., subject-specific) function.

3.6.2—the Global Multi-Entity Language Dictionary

The global multi-entity language dictionary is a language dictionary (see: 3.1.2, above) contains comprehensive required data from all voice recognition sessions conducted by all global multi-entity licensees, for a particular subject-specific (e.g., job-specific) function within a vertical industry, profession, or government agency voice recognition product (see: 3.2.3, above) on an ongoing cumulative basis. There are multiple global multi-entity language dictionaries (see: 2.1 and 2.3, above), one for each subject-specific (e.g., job-specific) function within each vertical industry, or government agency voice recognition product (see: 3.2.3, above).

The global multi-entity language dictionary may be referred to as (1)—global multi-entity language dictionary, (2)—the global multi-entity language dictionary, (3)—language dictionary, (4)—the language dictionary. Each of terms (1)—global multi-entity language dictionary, (2)—the global multi-entity language dictionary, (3)—language dictionary, (4)—the language dictionary is used interchangeable.

It should be hereafter understood, unless otherwise specifically mentioned, that when the terms vocabulary dictionary, language dictionary, as used hereinafter below, what is being referred to is an individual subject-specific (e.g., job-function specific) vocabulary dictionary or language dictionary belonging to a "language dictionary and vocabulary dictionary pair." The language dictionary and vocabulary dictionary pair corresponds to an individual subject-specific department level related task or "job-specific" function, within a separate subject-specific voice recognition product, where each of the products relate to one specific vertical industry, profession or government agency or other subject-specific entity, as mentioned above.

Each of the vocabulary dictionary and language dictionary pair may correspond to a particular individual subject-specific department level related task or "job-specific function." The vocabulary dictionary and language dictionary pair may be a "remote entity" used by users of the particular voice recognition product (above). Each specific user of the voice recognition product accesses and utilizes the "remote entity" "vocabulary and language dictionary pair" of the "remote entity," where the vocabulary and language dictionary pair relates to the individual user's job-specific (e.g., subject-specific) function.

3.6.3—Mini-Local Vocabulary Dictionaries for Speaker-Dependent Users

During the voice recognition error-correction process (described below), voice recognition errors are corrected (using the actual voice of the speaker and thereby the acoustics of each voice recognition error word and the associated digital text spelling of the word), which are added to the cumulative remote subject-specific RDB and to the remote subject-specific vocabulary dictionary. Thus, the error-correction process cumulatively improves the voice recognition accuracy of "all users" who utilize a remote subject-specific vocabulary dictionary.

Alternately, in order to reduce the search processing to only one specific speaker-dependent users' words and sentences, the RDB (which contains data relating to the speakers, such as the user-id and "speaker-mode" (e.g., a mode that is speaker-dependent) is used to periodically download mini vocabulary dictionaries containing only ongoing cumulative data of one user to the PC of each and every speaker-dependent user of the voice recognition system.

During the voice recognition session processing session for a specific speaker-dependent user, the voice recognition first searches the speaker-dependent users' PC mini vocabulary dictionary system to determine if the acoustics of the word being processed is a "known word."

Only in the case that the word being processed by the voice recognition system is found to be "not known" to the speaker-dependent users' PC mini vocabulary dictionary, then the Global Multi-Entity Vocabulary Dictionary (see: 3.6.1, above) will be searched to determine if the acoustics of a word being processed is either a "known word" or a "voice recognition error".

Note that the cumulative unedited speech may be either speaker-dependent or speaker independent.

3.7—Voice Recognition Error Correction Preparation:

3.7.1—Choosing the Voice Recognition Session Document(s) to be Corrected

FIG. 1 shows system screen utilized for user sign-on and choice of one specific subject-specific department level tasks or job-specific functions included in said Subject-Specific Voice Recognition product.

For each subject-specific voice recognition product, meaning each individual product relating to one specific vertical industry, profession, or government agency (see: 3.2.3), licensed to one single user (corporate, government agency, or individual user) a formatted post editor administration computer screen is presented to a person who is a "Post Editor Administrator". The formatted computer screen, may have a "drop-down" box, namely, the subject-specific task "drop-down" box, which contains the names of all the subject-specific department level tasks or job-specific functions included in said subject-specific voice recognition product.

Optionally, the post editor administration computer screen may also serve as a "sign-on screen," in which the post editor administrator may be required to input his/her user-ID and password.

The post editor administrator may then click (or otherwise select) one of the specified vertical industry or government agency subject-specific tasks (and/or job functions) in the subject-specific task "drop-down" box.

The post editor administrator may then depress a screen button, which may be entitled "SELECT," and the department level task (e.g., job-specific function) workload screen appears (see: 3.7.2, below).

3.7.2—the Department Level Task (or Job-Specific Function) Workload Screen

On a computer screen, the department level task (or job-specific function) workload screen will then be presented with a list of all outstanding voice recognition session(s) for the department level task in which the voice recognition session(s) contains one or more voice recognition errors within the department level task or job-specific function.

Each entry of the screen may include one of the voice recognition sessions. The voice recognition sessions may be arranged in chronological order based on the creation date and creation time of voice recognition session. Each session may list, the total number of voice recognition errors within the session, as well as the total number of outstanding uncorrected voice recognition errors in the voice recognition session (see: 3.3.1 data item #21, 3.3.3 data item #3, and 3.4.2 data item #3).

Included in each of the abovementioned voice recognition session entry, a box may be checked (or otherwise selected) by the user indicating a request that the voice recognition error-correction work relating to the correction of the voice recognition session be done by a third party contractor (e.g., a voice recognition software vendor), as well as a date indicator and a time indicator that are set by the post-editor (e.g., a user) indicating the requested date and time for the completion of the voice recognition session error-correction work.

Multiple (or all) of the above entries may be specified by the post editor administrator, as detailed above. The post editor administrator may specify the indication that the voice recognition error-correction work relating to the specified voice recognition session entries "correction of voice recognition errors" is performed by the third party.

When all the requests for voice recognition error-correction work relating to a particular set of voice recognition session entries (correction of voice recognition errors) to be done by the third party (e.g., by the voice recognition software vendor) outside contractor have been specified, the user then depressed a screen button, which may be entitled "send to contractor," and all of the selected department level task (job-specific function) workload screen entries will then appear as "sent to contractor", together with date and time of the submission, and the date and time of the requested completion of work.

Alternately, the vertical industry or government agency users (e.g., the post-editor) may "click" on or otherwise select any selected entry in the Department Level Task (job-specific function) workload screen, indicating that the voice recognition error-correction work relating to said voice recognition session entry will be done by the vertical industry, profession, or government agency (i.e., within the licensee organization).

It should be noted that in an embodiment, only voice recognition sessions having one or more voice recognition errors will appear on the department level task (job-specific function) workload screen (3.7.2).

The determination as to whether a specific voice recognition session contains one or more voice recognition errors is accomplished by examining the global multi-entity VR multi-session relational data base record (see: 3.6, above) corresponding to the VR session file header record (see: 3.4.1, above) which provides VR session specific data as detailed in 3.3.1 (above), data item field #21, and 3.3.3 (above), data item field #3.

The voice recognition product licensee organization or single user licensee may have a service agreement and/or a Service Level Agreement (SLA) voice, or any other form of business arrangement (e.g., product license agreement) with the third party contractor (e.g., a voice recognition software vendor) for financial remuneration regarding the above detailed voice recognition session error-correction work.

The entire voice recognition session error correction process detailed below may be totally invisible to the individual user of the present invention. Regarding voice recognition system users, all that users want and expect is a correct error-free text copy of precisely what the user spoke. Each user receives (after an "agreed-to" (e.g., as specified in the SLA) post-error-correction delay), a totally error-free verbatim text copy of what he/she actually said during a specific voice recognition session.

3.8—Voice Recognition Errors May Contain One or More Words

FIG. 2 shows a screen for the correction of voice recognition errors within one single sentence within one voice recognition session.

The purpose of the voice recognition error correction process is to correct all voice recognition errors in a selected voice recognition session. The process for selecting the voice recognition session for voice recognition error correction is mentioned above in paragraphs 3.7.1. and 3.7.2 (above).

As detailed above, in an embodiment, the voice recognition program is modified (by use of UIs, above) so that during every voice recognition session conducted by each and every user of the system a recording of the sentence or continuous unedited speech as well as a recording of each individual word as spoken by the voice recognition session user is extracted and saved in the RDB.

In addition, if the acoustics of a spoken word has been definitively recognized by voice recognition program, the text spelling of the word is extracted from the vocabulary dictionary and saved together with the recording of the word in the relational database (RDB).

Alternately, if the acoustics of a spoken "word" has not been definitively recognized, an indication that the "word" is a "voice recognition error" is saved together with the audio recording of the "word" in the RDB.

It is natural to associate the term "voice recognition error" with "one singular word" that a voice recognition program was not able to definitively identify. However, a voice recognition error is not always one word. In actuality, the audio recording of a voice recognition error "word" stored in the RDB may consist of a single word, multiple words, or the entire rest of the sentence, or a larger group of words.

The problem is that, at times, voice recognition technologies cannot "recover" after encountering a voice-recognition-error. The reason is that voice recognition analyzes acoustic sounds while at the same time, when people speak at a normal natural pace (continuous speech), the speech usually does not contain any significant time pauses between words. Although there are sophisticated speech recognition algorithms specifically designed to solve the problem of identifying individual words within continuous speech, at times the speech recognition algorithms locate the beginning of the second word (while missing the beginning of the first word), or the beginning of the third word (while missing the beginning of the first and second word), or the speech recognition simply completely fails. The failure of the speech recognition algorithm will be addressed below.

Post Editing Process:

3.9—Voice Recognition Error—Audio & Sentence Editing

FIGS. 3-5 shows a—Single Entity (Single Entity Licensee) Configuration (FIG. 3). FIG. 3 illustrates a high level depiction of processing of Program #1 as detailed in 3.9, on a periodic basis (e.g. daily), the single entity VR multi-session database of "single entity licensees" containing data relating to the licensees' use of a subject-specific voice recognition product is processed by a computer program (Program #1) to update each of the single entity licensees' multiple subject-specific vocabulary dictionary and language dictionary pairs, each of the pair relating to a single subject-specific department level related or subject-specific task "job-specific" function contained in a vertical industry or government agency product.

In the case of sentences, a single sentence or multiple sentences may be displayed on "the voice recognition error—audio and sentence editing screen" (see: 3.10 below) with one or more bright yellow spaces between words. Each bright yellow space between written words indicates that a "voice recognition error" has occurred. Alternatively, another visual indication is presented indicating that a voice recognition error has occurred and optionally indicating where the voice recognition error occurred.

In the case of Continuous Unedited Text (see: 1.7.2, above), a continuous string of lower case words may be displayed on "the voice recognition error—audio and sentence editing screen" (see: 3.10 below) (e.g., with one or more indications (e.g., highlighted spaces, such as bright yellow spaces) between words, where each indication between written words indicates that a "voice recognition error" has occurred, and that one or more words (that correct the voice recognition error) need to be inserted where the indications are.

The purpose of the "voice recognition error—audio and sentence editing screen" (see: 3.10 below) is to:

(1)—Enable a human "post-editor" to break down the single indications of voice recognition errors that contain the audio of multiple words into multiple indications which contain the audio of a "single word," and:

(2)—In the case of Continuous Unedited Text (see: 1.7.2, above), enable a human "Post-Editor" to recreate the original sentences from a continuous string of lower case text words which will later appear in the below "voice recognition error—error correction screen" (see: 3.11, below) where the text (e.g., the "sentences") contains both correctly recognized text and indications of voice recognition errors (e.g., "bright yellow spaces"), where each indication of the a voice recognition error corresponds to individual words.

The above continuous string of lower case text words (where the words are the words as spoken by a single user, or words spoken by multiple users, talking in-turn), may result from usage of the system's "meeting stenographer," feature (which is described in the section entitled "speaker identification" (detailed in: 3.3.5, above)—the meeting stenographer enables multiple speakers during a single voice recognition session).

As mentioned above, a problem is that it is possible that a single voice recognition error (e.g., a single bright yellow space between words) may contain a single word, multiple words, the entire rest of the sentence, or even multiple sentences, or parts thereof. When a voice recognition error contains more than one word spoken by the user, audio-editing of the voice recognition error is required.

The purpose of "audio editing" is to ensure that each single voice recognition error (e.g. each continuous group of bright yellow spaces between words) shown on the voice recognition error—error correction screen (see: 3.11, below) relates to (e.g., contains) the audio recording of "one and only one" word, which the voice recognition program was unable to recognize as a word.

The necessity for voice recognition error audio-editing is simple. In order to continually improve the voice recognition "knowledge-base" (e.g., by continually improving the Vocabulary Dictionary and Language Dictionary) using the below the voice recognition error—error correction screen (see: 3.11, below) voice recognition errors that contain "multiple words" (e.g. 3 words) are broken-down into multiple voice recognition errors that contain only "one single word" (e.g. 3 voice recognition errors).

As a result, instead of seeing a single indication of a voice recognition error (e.g., a single block of "bright yellow spaces between words") that may relate to (e.g., contains) the audio recording of multiple words, the entire rest of the sentence or multiple sentences, after "audio editing", appears as multiple indications of voice recognition errors (e.g., multiple "bright yellow spaces between words"), each of which relates to (e.g., contains) the audio recording of one single word.

The audio editing is desirable so that the use of the voice recognition error—error correction screen (see: 3.11, below) can be used to correct single word "voice recognition errors" in order to continually improve the voice recognition "knowledge-base" (e.g., the subject-specific vocabulary dictionary and language dictionary) for users of the system.

3.10—the Voice Recognition Error—Audio & Sentence Editing Screen 3.10.1—Editing Voice Recognition Error(s)

When people speak at a nature pace (e.g., as continuous speech) there are not necessarily any time pauses between words, and some people talk faster than others. It is therefore difficult or impossible for a human audio-editor to correctly separate and distinguish the exact second (or fraction thereof) that divides two words in order to separate between words while listing to an audio recording of either the whole sentence or continuous unedited text (see: 1.7.2, above) as spoken by the user, or multiple words contained in a single voice recognition error.

The solution provided by the "voice recognition error and sentence audio-editing" screen is to enable the audio-editor to control the speed of the audio recording. When listing to the audio of a voice recognition error containing multiple spoken words, the speed of the recording can be reduced to a level at which it is comfortable for the Audio-Editor to hear the words contained in a single voice recognition error in "slow-motion", and to manually place a "break" between words. When the audio-editor listens to the edited voice recognition error containing multiple words there will be a "time pause" between words. If the Audio-Editor is not satisfied with the results, he/she can hit "Clear" and repeat the process. When satisfied with the results, the Audio-Editor will "Save", and then instead of a single indicator (e.g., a single bright yellow space) between words, multiple concurrent indicators (e.g., bright yellow spaces) (e.g. three) will appear on the screen, with each of the indicators (e.g., bright yellow spaces) containing an audio recording of "one single word".

3.10.1.1—Technology Behind "Editing Voice Recognition Error(s)", (3.10.1, Above)

1—Prior to audio-editing, the corresponding sentence in the relational database contains an indication of a single voice recognition error and a corresponding audio recording of one or more words contained in the single voice recognition error (see: The VR Session Word Record, 3.4.2, above)

After audio-editing, each "single" voice recognition error that contains multiple words (e.g. 3 words) the relational database is updated (changed) to contain multiple voice recognition errors (e.g., 3 separate voice recognition errors), where each voice recognition error contains the audio of voice of one single word.

In other words, three separate "VR session word records" containing the audio of a single word, see 3.4.2, above, is created to replace the single "VR session word record" containing the audio of the separate words (see 3.4.2, above), with each of the VR session word record (see: 3.4.2, above) having a "VR error indicator" (see: 3.4.2, data item #2.3) set to the value of "YES".

Several "additional" RDB-VR session word records" are created, as described above, (3.10) so that each VR session record, instead of containing the audio of multiple words, contains the audio of one and only one single word. The audio of one the single word is added to the "VR session file header record" (see: 3.4.1. above) data field corresponding to the "total number of voice recognition errors in the voice recognition session" (see: 3.3.1, data item #21, above).

For example, in the case that a single "VR Session Word Record" containing the audio of three separate words, the voice recognition error is corrected as detailed in the above process (3.1.0). Three separate "VR Session Word Records," each containing the audio of a voice recognition error relating to one single word (replacing the single "VR session word record" in the RDB), the "additional number voice recognition errors (i.e. the number two)" is added to the "VR session file header record" (see: 3.4.1. above) data field corresponding to the "total number of voice recognition errors in the voice recognition session" (see: 3.3.1, data item #21, above).

3.10.2—Sentence Editing

FIGS. 3-5 show examples of pages for editing sentences having voice recognition errors prior to correcting the errors.

The sentence editing process of recognizing a complete sentence and manually placing a period i.e. "." at the end of the sentence and placing a capitalized letter at the beginning of the first word of the sentence" (3.10.2). The recognizing of a complete sentence begins and consequently is continued at the point when one or multiple voice recognition errors have been corrected, as per the above (see: 3.10.1, above), and by and through the process of recognizing of a complete sentence, the meaning of the sentence and the position at which the "end of a sentence" becomes clear and apparent to the human post-editor.

The minimum requirement for a group of words to be recognized as a sentence by the system is that the post editor insert a beginning of sentence indicator, which could be done by capitalizing the first letter of the first word, and the post editor insert an end of sentence indicator after the last word of the sentence, which could be performed by inserting a period. In addition, the post editor may add valid grammatical punctuations (e.g., comma, colleen, semi-colleen, etc.) as appropriate.

In the case that the "sentence" ends with a voice recognition error containing a single word ("bright yellow spaces"), the human post editor will place a period (".") (or other end of sentence indicator) directly after the end of this voice recognition error (e.g., which may be indicated by "bright yellow spaces"). In the case that the "sentence ends with a correctly identified text word not followed by a period, the human post editor will place a period "." (or other end of sentence indicator) directly at the end this text word.

In an embodiment, the case that the "sentence" begins with a voice recognition error containing a single word ("bright yellow spaces"), no action is required. The present system will automatically capitalize the first letter of the first word of the sentence and/or insert another beginning of sentence indicator, when the voice recognition (i.e. bright yellow spaces) error is corrected in the "Voice Recognition Error—Error Correction Screen" (below).

In an embodiment, at the point that the post editor completes both audio-editing and sentence-editing for a sentence, as per above, he/she then clicks the "sentence complete" button (or enters another indication that the post editor is finished editing the sentence), and the sentence will be removed (will disappear) from the screen.

The post editor will then repeat the above process for the next sentence (or sentence creation for "continuous unedited text"), and so on, until all sentences within a voice recognition session have been completed.

3.10.2.1—Technology Behind "Sentence Editing" (3.10.2, Above)

After the Editing of a sentence (or creation of a sentence from Continuous Unedited Text) as per 3.10.1 (above):

3.10.2.1.1—

The end of a sentence occurs when either a word, or a voice recognition error containing the audio of a single word, is directly followed by a period "." (or another end of sentence indicator), then:

1—An "end of sentence indicator" is inserted into the corresponding VR session word record (see: 3.4.2, data items #'s 3.1 and 3.2, above), and:

2—The number one "1" is added to the RDB voice recognition session "header record" field corresponding to 3.3.1, data item #20 (above), entitled "Total Number of Sentences in the Voice Recognition Session".

3—In the case that a single voice recognition error contains more than one word, and is edited in accordance with 3.10.1 (above), the number of additional voice recognition errors containing the audio of one and only one single word, as detailed above, is added to a "counter".

The counter is added to each sentence "word number" of each word in the "VR sentence word record (see: 3.4.2, data item #4) until the last word of the sentence and including the last word of the sentence (see: 3.10.2.1, data item #3, above).

4—When the end of a sentence is determined, as detailed in 3.10.2 (above), the VR session word record corresponding to the last word of the sentence is updated with an "end of sentence" indicator (see: 3.4.2, data item #3, above).

5—When the last sequential VR session word record in the VR session file (see: 3.4, above) relating to a specific voice recognition session has been reached, a "VR Session File Trailer Record" will be created (see: 3.4.4) at the end of the "VR Session File" (see: 3.4, above).

3.10.2.1.2 In the below description of the "The Voice Recognition Error—Error Correction Screen" each single sentence containing one or more voice recognition errors (which may be indicated by bright yellow spaces or by another indication), as detailed above, will be presented on the screen one sentence at a time. Each voice recognition error will contain the audio of one single word.

3.11—The Voice Recognition Error—Error Correction Screen

FIGS. 6 and 7 show examples of screenshots of pages for correcting voice recognition error.

The entity being corrected is a single voice recognition session conducted by a single user or in the case of the present system's meeting stenographer feature, for multiple users, as described in the section entitled "Speaker Identification" (detailed in: 3.3.5, above). The meeting stenographer feature enables multiple speakers during a single voice recognition session.

A single voice recognition session of the meeting stenographer feature may be chosen from a list of voice recognition sessions that contain "voice recognition error(s)", see above.

As stated above, in an embodiment, at this point in the error-correction process, the system's RDB contains data for every voice recognition session conducted by every user of the system, containing every sentence in each session, and every word in every sentence in the session, as well as the specific word(s) in each sentence that were determined to be "voice recognition error(s). In another embodiment, at this point in the error-correction process, the system's RDB is continually updated with new voice recognition sessions conducted by many, most, or nearly all user of the systems. The RDB may contain many, most, or nearly all of the sessions, and many, most, or nearly all of the words in the session, as well as the specific word(s) in each sentence that were determined to be voice recognition error(s).

In an embodiment, starting from the beginning of the voice recognition session, and proceeding in sequential order, a single sentence that contains one or more voice recognition errors is displayed on the screen for voice recognition error correction.

A single sentence may be displayed on the screen with one or more indicators, such as bright yellow spaces between words (or at the beginning or end of the sentence), indicating that voice recognition software, using the voice recognition vocabulary dictionary, was unable to definitively associate the recorded sound (acoustics) of a word as spoken by the user with the multiple various recorded word acoustics (e.g., pronunciations) relating to the text word in the vocabulary dictionary—simply put, the indicators, such as the bright yellow space means that a "voice recognition error" has occurred.

The process of correcting voice recognition error(s) within a sentence displayed on the screen is as follows:

(1)—Any word in the sentence may be selected (e.g., by clicking on the word), and you an audio recording of the entire sentence is played, as spoken by the user during the voice recognition session.

(2)—Any indicator of a voice recognition error (e.g., bright yellow spaces) in the sentence may be selected (e.g., by clicking on the indicator), and:

2.1—A recording of the voice recognition error "word" is played as spoken by the user during the voice recognition session.

2.2—A list of candidate words (e.g., in a "Drop-Down" box) may then appear. For example, the list of candidate words may contain every word in the entire voice recognition "vocabulary dictionary" or at least contains one or more words of the of the voice dictionary.

The user may scroll down, and try to find an existing recorded text of the word that was played, and, if found, the word is an "existing word" in the vocabulary dictionary. The user can then select the "existing word" in a menu, such as from a "Drop-Down" box. The user may find that the word that was selected in the list of candidate words (e.g., the in the drop down menu) now replaces the indication of the voice recognition error (e.g., replaces the portion of the sentence highlighted in yellow).

2.3—If the word played in the recording (see: #2, above) cannot be found in the words that appear in the menu (e.g., in a "Drop-Down" box) (containing all words in the vocabulary dictionary), the word is a "new word." Then, the user simply enters the correct spelling of the word that was played in a screen space, which may be entitled a "new word," and then selects a screen button, which may be entitled "new word." The user may find that the word entered now appears instead of the indication of a voice recognition error (e.g., instead of the "yellow spaces").

(3)—The above process of correcting errors may be repeated until there are no more indications of voice recognition errors (e.g., until there are no more "yellow spaces") left in the sentence on the screen. When all the indications of voice recognition errors are replaced with words, the user may select (e.g., by clicking on) an indication that the sentence has been corrected (e.g., such as a "Sentence Corrected" button), and if all voice recognition error word(s) in the sentence have been corrected properly, the next sentence in the sequence in the specific voice recognition session may appear on the computer screen for correction, as detailed above.

(4)—Next the user (e.g., the editor) may continue to correct another sentence that appear on the computer screen, as detailed above, until all the sentences in the specific voice recognition session that contain voice recognition error(s) have been completed. Optionally, the sentences are corrected in the order that the sentences occur in the session and/or the order that the sentences are listed on the display.

3.11.1—Technology Behind the Voice Recognition Error Correction Screen (3.11, Above)

1—When a voice recognition error within a sentence within a voice recognition session is corrected, as detailed in 3.11, above and the voice recognition error is an "existing word", then:

1.1—The digital text spelling of the word recognized (see: 3.4.2, data item #2.1, above) within the specific VR session word record (see: 3.4.2, above) corresponding directly to one single specific corrected voice recognition error is updated with the word selected from the list of choices (e.g., in "Drop-Down box") (see: 3.11, data item (2).2.2, above), where the list of choices (the "Drop-Down box") contains a list of candidate words from the vocabulary dictionary (e.g., all digital text words in the vocabulary dictionary).

1.2—The "word VR error indicator" (see: 3.4.2., data item #2.3, above) within the specific VR session word record (see: 3.4.2, above) corresponding directly to one single specific corrected voice recognition error is updated with an indication that the voice recognition error was corrected (e.g., recognized) by for example inserting the digital text "OK," indicating that a subsequently corrected voice recognition error is associated directly with an existing digital text word in the vocabulary dictionary.

2—When a voice recognition error within a sentence within a voice recognition session is corrected, as detailed in 3.11, above and the voice recognition error is an "new word", then:

2.1—The digital "text spelling of recognized word" (see: 3.4.2, data item #2.1, above) within the specific VR session word record (see: 3.4.2, above) that corresponds directly to one single specific corrected voice recognition error is updated with the digital word that was typed in the Voice recognition error correction screen (3.11, above) in for example a field, that may be indicated by a screen space that may be entitled "new word" (see: 3.11 data item (2).2.3, above).

2.2—The "word VR error indicator" (see: 3.4.2., data item #2.3, above) within the specific VR session word record (see: 3.4.2, above) is updated with an indication (e.g., the digital text "NEW WORD") that a new word has been added to the vocabulary dictionary, which may result from a corrected voice recognition error which has no corresponding digital text word in the vocabulary dictionary.

3—In the case of a corrected voice recognition error, as per 3.11.1 above, that resulted from a session in which the meeting stenographer facility was utilized (see: 3.3.5, above), then:

3.1—If the corrected voice recognition error is the first word at the beginning of a meeting (e.g., a voice recognition session with multiple speakers) the first high definition recording of first word of the session (see: 3.3.3, data item #2) is examined by the speaker recognition technology using the voice samples (above) of each meeting participant to determine which participant spoke the first word of the voice recognition session. A speaker VR session file (see: 3.3, above) having a speaker identification record (see: 3.4.3, above) that identifies the speaker is then created, and the record is placed directly before said first word of the continuous unedited speech text output of the voice recognition session. Alternatively, in the table of sentences and/or the table words, each record has a field indicating the speaker of the sentence and/or word, respectively. Optionally, there may be a table of speakers, in which each record contains information about particular speakers, the sessions participated in by the speaker, the sentences spoken be each speaker, and/or the words spoken by the speaker. Each speaker may have a table and/or a set of tables in which there are records for each sentence and/or word spoken by that speaker.

3.2-Thereafter, in the case that a subsequent word is a corrected voice recognition error, the audio pronunciation of the subsequent word (contained within the below VR Session File, Word Record, 3.4.2, data item 2.2) is examined by Speaker Recognition technology) to determine if the identity of the speaker of the subsequent word is the same as that of the speaker of the previous word.

In the case that speaker of the subsequent word is not the same as the speaker of the previous word; a speaker identification record (3.4.3) is created and placed directly before the subsequent word in the VR session file. Alternatively, the sentence record contains a field that indicates that the speaker of the current word is different from the speaker of the sentence within in which the word recognition error occurred.

The process of correcting voice recognition errors is repeated, word by word, until the last word audio (see: 3.4.2, data item 2.2, above) corresponding to the last word of the voice recognition session (see: 3.4.4, above) has been processed, as per the above.

4—When the last of the VR session word records relating to a specific voice recognition session has been processed (e.g., the VR session records may be arranged in a sequential list), a "VR session file trailer record" (see: 3.4.4, above) is encountered, as detailed in 3.3.6, above, and the above processing for the specific voice recognition session is terminated.

3.12—Making Corrected Voice Recognition Session(s) Available to the User

Directly after a voice recognition session has undergone the correction process (see: 3.7-3.11, above), the corrected text, and optionally the corresponding sentence by sentence audio of the original speaker's voice of the sentence, as spoken by the user (or the users in the case of a "meeting" (e.g., a single voice recognition session with multiple speakers), (see: 3.3.5, above) during the voice recognition session, is immediately made available to the user.

In an embodiment, each user provided with a cumulative list all voice recognition sessions ever sent for error-correction, and the current status of each said voice recognition session (i.e. (1)—"In-Process" or (2)—"Complete"). Alternatively, user is provided with a list of the voice recognition session that the user is authorized to access and/or participated in.

In an embodiment, each session is marked with a status that indicates whether the error correction has not yet begun, is in progress, or completed. Next to each session that is indicated as in progress, an indication appears showing the date and time that the voice recognition session was submitted for error-correction, as well as the estimated date and time for error-correction completion of said voice recognition session.

For the sessions in the list with a status of "complete", the date and time that said voice recognition session was submitted for error-correction is provided (e.g., detailed on the screen), as well as the date and time that the voice recognition session error-correction was completed and made available to said user.

The user can select any completed voice recognition session from the list, and the text of said session appears on said user's computer screen. Optionally, the user may also be able to selected sessions in which the error correction process is still in progress.

In the case "edited structured speech" the user may select "any word" in the sentence, and the user can hear an audio recording of the entire sentence, as spoken by the speaker during the voice recognition session.

In the case "continuous unedited speech," the user may select (e.g., click on) "any word" in the sentence, and an audio recording of the entire sentence is played, as spoken by the user during the voice recognition session, which may have short time intervals between each word in the sentence.

The sentences that appear on the user screen for a specific voice recognition session are derived from records associated with the specific VR (voice recognition) session file (see: 3.4-3.4.4) within the RDB.

In the case that the "the meeting stenographer" facility is being utilized in a specific voice recognition session, as described in 3.3.5 above, the speaker identification records are read, and as result a display may 1—Optionally, one line is skipped, displaying a blank line on the screen.

2—The display may provide detailed data from the speaker identification record (below) on the next line:

2.1—Name of Speaker 2.2—Title (e.g. Lawyer)

2.3—Function (e.g. Defense Counsel)

3—Another line may be skipped, displaying a blank line on the screen.

4—Continue processing and continue displaying sentence data on the screen as derived from the specific VR (voice recognition) Session File records (see: 3.4-3.4.4) within the RDB as detailed in 3.12 (above).

3.13—The Archive

In an embodiment, the RDB may contain every word in every sentence, as spoken by every product user, within all VR sessions ever conducted by every user on an ongoing cumulative basis by all users of a subject-specific voice recognition product (see: 2.1, and 3.2.2 and 3.2.3, above).

Relational Database Technology allows the definition of different data formats (i.e. record types); with each record type containing any number of defined data items (i.e. data fields).

Literally, every data item (e.g., data field) within every said specific data format (i.e. record type) can be defined as a relational database "Access Key" by which either a specific record or all records within a record type can be retrieved. For more specific retrieval, multiple access keys can be employed utilizing a Boolean search relating to the relationships between the access keys and the data values that the access keys contain in said RDB.

In the system, a product user may retrieve from the RDB any voice recognition session that they participated in.

3.13.1—Examples of Boolean Search Retrieval Capability:

RETRIEVAL REQUEST:

Please retrieve a list of voice recognition sessions which meet the following CRITERIA:

(1)—A list of voice recognition sessions that the user conducted:

OR the user can specify:

(2)—A list of voice recognition sessions
  1—That the user conducted between February and March 2015.

OR the user can specify:

(3)—A list of voice recognition sessions that the user conducted:
  1—That the user conducted between February and March 2015, AND.
  2—Relating to the (Subject-Specific) Job-Function-Specific Function of "Y".

OR the user can specify:

(4)—A list of voice recognition sessions that the user conducted:
  1—That the user conducted between February and March 2015.
  2—Relating to the (Subject-Specific) Job-Function-Specific Function of "Y"-AND
  3—That was a "Meeting Stenographer" voice recognition session OR the user can specify:

(5)—A list of voice recognition sessions that the user conducted:
  1—That the user conducted between February and March 2015.
  2—Relating to the (Subject-Specific) Job-Function-Specific Function of "Y"-AND
  3—That were a "meeting stenographer" voice recognition session-AND
  4—Participants included: John OR Jack AND Jim AND Jane 3.13.2—Select Voice Recognition Session for RETRIEVAL"

Select Voice Recognition session Archive in the above list (see: 3.13.1, above) and the selected Voice Recognition Session is retrieved and presented on the screen in text format with audio capability (see: 3.12, above).

Maintenance Process 3.14 Updating the Appropriate Voice Recognition System Dictionaries:

The dictionaries that are updated may include
  (1)—the vocabulary dictionary (3.6.1), and
  (2)—the language dictionary (3.6.2), and
  (3)—the mini-local vocabulary dictionary for the speaker-Dependent users (3.6.3).

Program #2:

Program #2 updates the personal and shared vocabulary library dictionaries and the personal and shared library dictionaries (e.g., program #2 updates everything for the last run of program #2, on a periodic basis (e.g. daily). The global entity VR multi-session database of the "global entity licensee" contains data relating to the licensees' use of a subject-specific voice recognition product (see: 3.6 and 3.2.3 above). The global entity VR multi-session database is processed by a computer program (Program #2) to update each set of multiple subject-specific vocabulary dictionary and language dictionary pairs. In other words, each pair may include a subject-specific vocabulary dictionary and a subject-specific language dictionary. Each pair may relate to a single subject-specific department level, which may be related to a subject-specific task, such as a "job-specific" function—see: 3.6 and 3.4 through 3.4.3 above. The subject-specific vocabulary dictionary and a subject-specific language dictionary that are updated may be part of a vertical industry or government agency product, which is used concurrently by all specific global multi-entity licensees of a particular subject-specific speech recognition product. Program #2 may update the vocabulary dictionary, language dictionary, and mini-local vocabulary dictionary, after the RDB has been updated with the corrected sentence.

After the error correction process (3.7-3.11.1, above) has been completed for a multiple voice recognition sessions and on a periodic basis (e.g., weekly), a computer program may be initiated (e.g., program #2), to update each set of the multiple subject-specific vocabulary dictionary-language dictionary pairs, and if applicable, the subject-specific mini-local vocabulary dictionary for speaker-dependent users (3.6.3), directly corresponding to the chosen subject-specific topic (see: 3.3.1, data item #8, above) of each of the voice recognition sessions processed by the computer program (i.e. Program #2), as detailed below:

3.14.1—RDB record (3.4.1-3.4.4, above) relating to a single specific voice recognition session may be retrieved by specifying values for the following parameters/keys:

RDB Boolean Retrieval Criteria:

(1)—FIELD:
  GMT date and time of VR error-correction completion for the entire VR session (3.3.1 data item #18, above). In other words, all sessions may be retrieved for a particular date and time or date and time range and the user may select the session of interest, if there is more session with that date and time.

RETRIEVAL (BY ABOVE FIELD) CRITERIA:

When sessions within a particular time and date range are retrieved, the sessions may be listed in ascending order
  1—In an embodiment, the time and date may be greater than the date and time of the last previous execution of Program #2

(AND)

(2)—FIELDS:

Session may also be retrieved by specifying
  1—The GMT date and time of the completion of the update of the vocabulary dictionary for the voice recognition session of interest (see: 3.3.1, data item #22).

2—The GMT date and time of the completion of the update of the language dictionary for the voice recognition session of interest (see: 3.3.1, data item #23).

3—The GMT date and time of completing the update of the Mini-Local vocabulary dictionary for the voice recognition session of interest (see: 3.3.1, data item #23).

RETRIEVAL (ABOVE FIELDS) CRITERIA:
In an embodiment, when retrieving a session by specifying the time and dates of the completion of updating the vocabulary dictionary, language dictionary, and the mini-vocabulary dictionary, if one is looking for sessions with words that need to be added to the vocabulary dictionary, language dictionary, and the mini-vocabulary dictionary, the above Fields (1-3) must all="Null," because the update is not complete.

(AND)
(3)—FIELD:
1—The total number of voice recognition errors in the voice recognition session (see: 3.3.1, data item #21). In other words, records for sessions may be retrieved by specifying the total number of voice recognitions errors in the voice recognitions session, and in response a list of session having the number of voice recognition errors specified may appear on the display.

RETRIEVAL (BY ABOVE FIELD) CRITERIA:
1.1—In an embodiment, the field for the number of voice recognition errors must equal zero, because the voice recognition errors are not tallied until the updating is complete. Thus, in this embodiment, if one searches for sessions having voice zero voice recognition errors, one will find all the sessions that have not been processed, yet.

When, according to the above criteria (3.14.1), all RDB records for all voice recognition sessions have been accessed (e.g., there are no more RDB VR session files (3.4) records to be accessed, which meet the above access criteria (see: 3.14.1, above), the processing of program #2 may be terminated, and the GMT date and time of the termination will be recorded.

3.14.2—Retrieve (1)—subject-specific vocabulary dictionary and (2)—subject specific library dictionary pair:
RETRIEVAL CRITERIA:
1—Retrieve the subject-specific vocabulary dictionary and subject specific library dictionary pair using a "subject specific topic" equal to the above retrieved (3.14.1) RDB "VR Session File Header Record" field: "Chosen Subject-Specific Topic (see: 3.3.1, data item #8)

3.14.3—Retrieve the VR session file (3.4.) records in sequential order:
Retrieve each single record in sequential order from accessed RDB records (3.4.1-3.4.4, above) relating to a single specific voice recognition session.

The first record encountered may be the VR session file header record (3.4.1), which will be saved for further reference by program #2, after which a single VR session word record (see: 3.4.2, above) will be accessed and processed, as detailed below. Other VR session file (3.4) record types are bypassed, except for the VR session file trailer record (3.4.4).

The VR session file trailer record (3.4.4) indicates that the end of the specific voice recognition session has been reached, and the processing performed by program #2 continues from 3.14.1, above.

3.14.4—Process a retrieved VR session word record (see: 3.4.2, above):
(1)—Update Subject-Specific Vocabulary Dictionary (see: 3.14.2, above)
1—If the text spelling of the recognized word in the VR session word record (see: 3.4.2.2, data item #1) already exists as a digital text spelling of a word in the subject-specific vocabulary dictionary (see: 3.4.2, above), it is an "existing word", then:
1.1—The audio recording of the individual word in the (VR session word record see: 3.4.2.2, data item #2) is added to the subject-specific vocabulary dictionary (see: 3.14.2, above) as an additional audio recording associated with the digital text spelling of said word in the subject-specific vocabulary dictionary.
2—If the text spelling of the recognized word in the VR session word record (see: 3.4.2.2, data item #1) does not already exists as a digital text spelling of a word in the subject-specific vocabulary dictionary (see: 3.4.2, above), it is a "new word," then:
2.1—The text spelling of the recognized word in the VR session word record (see: 3.4.2.2, data item #1) is inserted into the specific vocabulary dictionary (see: 3.4.2, above) in digital text format.
2.2—The audio recording of the individual word in the VR session word record (see: 3.4.2.2, data item #2) is added to the subject-specific vocabulary dictionary (see: 3.14.2, above) as an audio recording associated with the digital text spelling of said word in the subject-specific vocabulary dictionary.

(2)—Update subject-specific mini-local vocabulary dictionary for speaker-dependent users
1—In the case that the RDB header record (see: 3.4.1, above) indicates that the system user is in a "speaker-dependent mode" user (see: 3.3.1, data item #25), then:
1.1—If the text spelling of the recognized word is an "existing word," as detailed in 3.14.4, (1).1, above, then:
The "high definition digital audio recording of the individual word in the (VR session word record see: 3.4.2.2, data item #2) is added to the mini-local vocabulary dictionary relating to one, and only one specific speaker-dependent user (see: 3.6.3, above). The data addition to the mini-local vocabulary dictionary located within the associated storage of a single user's PC (e.g., computing device) is accomplished using the user's "User-ID" (see: VR session file header record, 3.4.1, above, and 3.3.1, data item #5, above).

If the text spelling of the recognized word is a "new word", as detailed in 3.14.4, (1).2, above, then:
1—The text spelling of the recognized word in the VR session word record (see: 3.4.2.2, data item #1) is added to the mini-local vocabulary dictionary relating to one, and only one specific speaker-dependent user (see: 3.6.3, above). The data addition to the mini-local vocabulary dictionary located within the associated storage of a single user's PC (e.g., computing device) is accomplished using the user's "User-ID" (see: VR session file header record, 3.4.1, above, and 3.3.1, data item #5, above).
2—The "high definition digital audio recording of the individual word in the (VR session word record see: 3.4.2.2, data item #2) is added to the mini-local vocabulary dictionary relating to one, and only one specific speaker-dependent user (see: 3.6.3, above).

The data addition to the mini-local vocabulary dictionary located within the associated storage of a single user's PC (e.g., computing device) is accomplished using the user's "User-ID" (see: VR session file header record, 3.4.1, above, and 3.3.1, data item #5, above).

(3)—Update subject specific language dictionary (see: 3.14.2, above) with sentences, comprised of both the digital text and recorded audio of words, as spoken during the voice recognition session.

The subject specific language dictionary contains sentences, including both digital text and the associated audio recordings of each word in the sentence, as spoken by the speaker(s), during the voice recognition sessions conducted by the subject-specific user of the system.

Program #2 may update the subject-specific language dictionary with all sentences, comprised of individual words in both the digital text and the audio recording format for all sentences within each voice recognition session processed by the program #2.

Each iteration of program #2 processes one single RDB VR session word record (see: 3.4.2, above), which contains information regarding one single word: (1)—digital text spelling of the word, (2)—digital audio recording of the word, and (3)—an indication (e.g., end of sentence indicator), as to if the word is the last word of the sentence.

In each individual iteration of program #2, the computer program may construct sentences from single words as the records are processed in the sequential order of RDB VR session word records, where each record relates to one single word within a sentence.

To construct a sentence, program #2 logically computes which word is located at the beginning of the sentence, and which word is located at the end of said sentences as follows: 1—the beginning of the first sentence is the first word of the voice recognition session contained in the first RDB VR session word record, which is the first RDB VR session word record accessed by program #2. The last word of a sentence is indicated in RDB VR session word record, which contains an "end of sentence indicator" (see: above). The beginning of the next sentence, as well as all following sentences is the word (i.e. RDB VR Session Word Record) following the word (i.e. RDB VR Session Word Record) with said "end of sentence indicator". Alternatively, the field of each word record that indicates which sentence the word belongs to is read to find all the words in one sentence. Then a field is read in the record that records which word (e.g., the first word, second word, third word, or etc.) the word is in the sequences of words that make up the sentence. Then the words are arranged in the sequence indicated to construct the sentence. Optionally, the words of the sentence are additionally labeled in another field with the indicators indicating whether the word is the first word of the sentence, the last word of the sentence, or word between the first and last words of the sentence.

Once Program #2 has, throughout multiple iterations of Program #2, accumulated the words contained in a sentence in sequential order, the subject specific language dictionary is updated with the sentence consisting of individual digital words, and an audio recording of each said word.

After the single retrieved VR Session Word record (see: 3.4.2, above) has been processed, as detailed herein above, Program #2 processing may continue and perform the tasks indicted in section 3.14.3, above.

(4)—After all sentences in a single voice recognition session have been processed, as per above (i.e. 3.14 to here), and the (1)—Vocabulary Dictionary (3.6.1), and the (2)—language dictionary (3.6.2), and the (3)—mini-local vocabulary dictionary for speaker-dependent users (3.6.3) have been updated for all sentences in a single voice recognition session, as detailed above (i.e. 3.14 to here, then:

1—The GMT date and time of the completion of the update of the vocabulary dictionary for this voice recognition session (see: 3.3.1, data item #22) are updated with current GMT date and time.

2—The GMT date and time of the completion of the update of the language dictionary for this voice recognition session (see: 3.3.1, data item #23) are updated with the current GMT date and time.

3—The GMT date and time of the completion of the update of the mini-local vocabulary dictionary for this voice recognition session (see: 3.3.1, data item #23) are updated with the current GMT date and time.

3.15—the User-Specific Acoustic Model—Continuous Re-Training:

When a user purchases a voice recognition product, the Voice Recognition software "gets to know" the characteristics of a particular user's voice and the way the user pronounces words in sentences. Learning the manning that the user pronounces sentences and learning the characteristics of the user is the job of the Acoustic Model (which may have the user read a known text and compare the user's utterances to the known text, and then extract various characteristics of the user's voice, speech, and/or manner of speech). Technically speaking, An Acoustic Model is used in voice recognition to acquire and represent the relationship between an audio signal and the phonemes or other linguistic units that make up the user's speech, and the process of training the Acoustic Model is known as "Speaker Adaptation" (e.g. learning a person's pitch, tone, utterance speed, dialects, etc.).

With today's technology, in order to perform the Speaker Adaptation, a user specific Acoustic Model "training process" is required. The training process must be performed by the user when (and/or after) a new user receives voice recognition product, and must be completed before the user starts to use the voice recognition product (i.e., before the user's first voice recognition session), if the user wants the product to make user of the Acoustic Model.

A common form of such training is to require the user to read "out loud" (i.e. speak into a microphone) text sentences and paragraphs presented to the user by the computer. The amount of training performed (i.e., how much reading and/or speaking is done by the user) is solely at the discretion of the user, and a "usual" training process duration may be between 15 to 30 minutes.

the training process performed only one time (i.e. only before the user's first voice recognition session), and after the user's first voice recognition session, there is no existing automated technology which enables subsequent multiple passes of the Acoustic Model training process in order to continually improve the "Speaker Adaptation". our system, the most significant problem is that Acoustic Module does not learn the linguistic units of the user's pronunciations of "corrected" voice recognition error words as spoken by the user, so that the Acoustic Model would subsequently be capable of better assisting the other voice recognition internal modules (i.e. the Language & Vocabulary Dictionaries) in preventing the reoccurrence of corrected voice recognition errors, for the specific user.

word "update" and its conjugations (as in "updating" the Acoustic Model) is to be understood as being generic to the corresponding conjugation of retrain and replace. In general, whenever this specification mentions the concepts of retraining the Acoustic Model or replacing the Acoustic Model, one may substitute updating the Acoustic Model to obtain a different embodiment. Throughout this specification, the words, retrain, replace, and update and their conjugations may be substituted one for another to get different embodiments.

The problem is to create a process so that the specific user's Acoustic Model will periodically be updated and re-trained using:
  The original words as spoken by the user during the initial training session
  All voice recognition error words "ever" spoken by the user that have subsequently corrected by the system.
  In addition to the below, words and sentences which were free of (did not have) voice recognition errors may periodically be included in the following data files, detailed below which are used to periodically retrain and/or update each specific user's Acoustic Model:
  1—"User-ID Specific—Corrected VR Error Text File" &
  2—"User-ID Specific—Corrected VR Error Audio File),
  This inclusion of error free word data (i.e. text and audio) is in order to further increase the scope of the Acoustic Model's knowledge of each user's voice, especially in terms of the user's distinct way of speaking (e.g., accent).

The solution comprises:

3.15.1—Modification to the vendor supplied Acoustic Model Training program as follows:
  1—At the point the user initiates the Acoustic Model training process, an audio recording of the words spoken by the user into the microphone as the user vocalizes the digital training text as presented to the user by the computer will be created.
  2—At the point the user terminates the Acoustic Model training process, the above audio recording (see: 3.15.1.1, above) is copied to a file to be known as the "Acoustic Model initial training user Audio text file" and appended to the name of the file may be the User-ID of the user, so that the file name is specific and unique to a single user.
  3—The Acoustic Model Training program's predefined digital training text to be presented to the user by the computer is copied, in its entirety, is copied to a file which will be referred to as the "Acoustic Model initial digital training text file," and the User-ID of the user may also be appended to the filename of the Acoustic Model initial digital training text file, so that the file name is specific and unique to a single user.
  4—If the Acoustic Model Training program is to be used with the voice recognition program of another vendor, the modified Acoustic Model Training program, as per above (see: 3.15.1.1, 3.15.1.2. and 3.15.1.3, above) replaces original Acoustic Model Training program supplied by the other vendor and is used for the initial Acoustic Model Training process, instead of the original vendor supplied program. If the Acoustic Model Training program is part of its own product, there is no need to replace the another Acoustic Model training process.

3.15.2—Accumulating all Voice Recognition Errors (digital text and audio recordings of user pronouncing the word) throughout all voice recognition sessions ever conducted by each individual, specific user and subsequently corrected by the system (the following describes how voice recognition errors are accumulated):

In another embodiment, Voice Recognition Errors are accumulated one a schedule, optionally periodically, throughout multiple voice recognition sessions conducted by specific users and subsequently corrected by the system, so that the Voice Model is updated periodically or according to a preset schedule, so that automatically, the longer the user uses the voice recognition product, the more time the Voice Model is updated (whether or not the update occur every time and are based on all voice recognition errors).
  (1)—In an embodiment, after each System Maintenance run (e.g., starting from the first System Maintenance run ever performed)—each RDB Session File that had at least one voice recognition error corrected during the System Maintenance run is accessed optionally in sequential order (Note: The RDB Word record within the RDB Voice Recognition Session File may have an indicator relating to the word: "Corrected Voice Recognition Error". The indication of the corrected voice recognition error may be an RDB "direct access field" which may be used to access corrected voice recognition error words in sequential order contained in the Word Records throughout an RDB Voice Recognition Session File). In an alternative embodiment, the RDB Word record within the RDB Voice 102 Recognition Session File accessed periodically or according to another schedule and may happen at other times.
  (2)—In an embodiment, each RDB Session File Word Record that contains a "Corrected Voice Recognition Error" is accessed, and:
  The Text of three words (from 3 RDB Session File Word records) is accessed and the text of the three words are stored at the end of a remote expandable "User-ID Specific—Corrected VR Error Text File" (containing, in an embodiment, in sequential order, all corrected voice recognition error digital texts ever encountered by the user throughout all voice recognition sessions ever conducted by the user) as follows:
    1—The digital text of the word directly preceding the voice recognition error word.
    2—The digital text of the word which is the corrected voice recognition error.
    3—The digital text of the word directly following the voice recognition error word.
  The remote expandable "User-ID Specific—Corrected VR Error Text File" records will also contain the date and time of the last System Maintenance run for which it was processed.

(3)—Accumulating the Audio of all Voice Recognition Errors (audio recorded of user pronouncing the word) throughout all voice recognition sessions ever conducted by each individual specific user and subsequently corrected by the system (or throughout may voice recognition sessions recently conducted):
  1—The corresponding original digital audio recording of the above three words (see: 3.15.2.2.1-3.15.2.2.3, above) as spoken by the user is extracted from the RDB Session File Word Records and the extracted digital audio words are stored at the end of a remote expandable "User-ID Specific—Corrected VR Error Audio File" (containing, in an embodiment, in sequential order, the audio of all corrected voice recognition errors ever encountered by the user throughout all voice recognition sessions ever conducted by the user).

The remote expandable "User-ID Specific—Corrected VR Error Audio File" records may also contain the date and time of the last System Maintenance run for which it was processed.

3.15.3—Creating a "Secondary Acoustic Model Training Program"

The original vendor supplied Acoustic Model "training process" is, in effect a computer program which has two inputs: (1) user spoken audio via microphone corresponding to (2) predefined digital training text. The output of the program is a "trained" Acoustic Model.

A "Secondary Acoustic Model Training Program" is created by implementing the following:

(1)—The Audio file is used as input for the Acoustic Model (e.g., instead of using an audio input).

(2)—In order to recreate the Initial Training Session (described above) the following two files, specific to a single user, are processed by the program.
  1—The "Acoustic Model initial training user Audio text file"
  2—The "Acoustic Model initial digital training text file"

(3)—The below two files, specific to a single user, contain in sequential order, the text and audio respectively of all corrected voice recognition errors ever encountered by the user throughout all voice recognition sessions ever conducted by the user.
  1—The remote expandable "User-ID Specific—Corrected VR Error Text File"
  2—The remote expandable "User-ID Specific—Corrected VR Error Audio File.

(4)—The first processing phase of the "Secondary Acoustic Model Training Program" execution recreates the Initial Training Session, and the inputs for this phase are:
  1—The "Acoustic Model initial training user Audio text file"
  2—The "Acoustic Model initial digital text training text file"

(5)—At the point that the last audio record of the "Acoustic Model initial digital training text file" has been processed, the second processing phase of this program execution will input and processed:
  1—The remote expandable "User-ID Specific—Corrected VR Error Text File"
  2—The remote expandable "User-ID Specific—Corrected VR Error Audio File. In phase two, the program will Retrain the new Audio Model created using the above two files which include the text and audio respectively of all corrected voice recognition errors ever encountered by the user throughout all voice recognition sessions ever conducted by the user or alternatively from a sampling of corrected voice recognition errors encountered by the user throughout multiple voice recognition sessions (conducted by the user) that were not previously processed by the. Acoustic Model.

(6)—At the point that the second phase processing is complete, the output of the program is a Re-Trained Remote Acoustic Model for a single individual specific user, which Acoustic Model is up-to date, as of the date of the last System Maintenance run. The name of this Remote Acoustic Model will be made unique by appending the User-ID to the name of this Acoustic Model.

(7)—The "Secondary Acoustic Model Training Program" may be run multiple times, one time for each specific user, said users being selected by the following criteria. The user must:
  1—Have at least RDB Header Record of a Voice Recognition Session File in the RDB indicating the Voice Recognition Session has "Zero" current voice recognition errors (meaning that all of the Voice Recognition Errors have been corrected).
  And
  The Data and Time of the "Last System Maintenance Completion must equal the date and time of the last System Maintenance completion contained in the "User-ID Specific—Corrected VR Error Text File" as well as the date and time of the last System Maintenance completion contained in the "User-ID Specific —Corrected VR Error Audio File". (which files are produced as part of the System Maintenance process).

(8)—The output of each single run of the "Secondary Acoustic Model Training Program" will be an up-to-date Remote Acoustic Model for one specific user. The purpose of the up-to-date Remote Acoustic Model is to provide "roaming" capability enabling a user to have efficient access to the up-to-date Acoustic Model when a user is conducting or participating in a voice recognition session at a location other than their local computing device. In addition, storing the up-to-date Remote Acoustic Model on a portable or remote user device enables a user to directly access this Acoustic Model when participating in a "Meeting" (i.e. A Single Voice Recognition Session with Multiple Participants.).

(9)—Each of the Remote User-Specific Acoustic Models may be downloaded to each specific users' computing device, and replaces the existing Acoustic Model resident in the specific users' computing device, which the vendor may download and update via a network.

Figure 8:
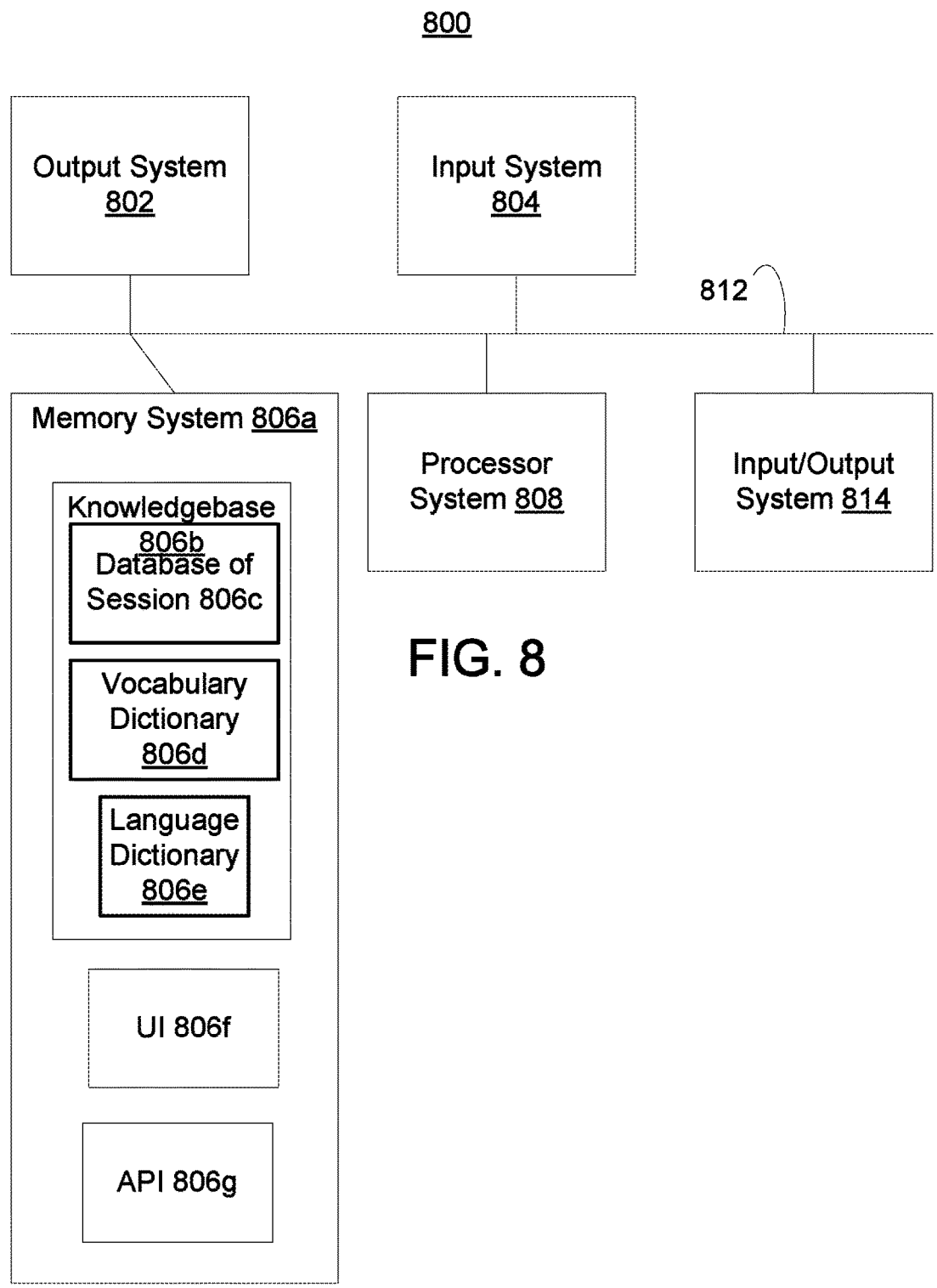
FIG. 8 shows a block diagram of a server used for voice recognition.

FIG. 8 shows a block diagram of a server 800 used for voice recognition. The server may include output system 802, input system 804, memory system 806*a*, which includes knowledgebase 806*b* having session database 806*c*, vocabulary dictionary 806*d*, optional language dictionary 806*e*, User Interface 806*f*, and Application Program Interface (API) 806*g*. Server 800 may also include processor system 808, communications system 812, and input/output device 814. In other embodiments, server 800 may include additional components and/or may not include all of the components listed above.

Server 800 is an example of server that may be used in the system in FIG. 1.

Output system 802 may include any one of, some of, any combination of, or all of a monitor system, a handheld display system, a printer system, a speaker system, a connection or interface system to a sound system, an interface system to peripheral devices and/or a connection and/or interface system to a computer system, intranet, and/or internet, for example.

Input system 804 may include any one of, some of, any combination of, or all of a keyboard system, a mouse system, a track ball system, a track pad system, buttons on a handheld system, a scanner system, a microphone system, a connection to a sound system, and/or a connection and/or interface system to a computer system, intranet, and/or internet (e.g., IrDA, USB), for example.

Memory system 806a may include, for example, any one of, some of, any combination of, or all of a long term storage system, such as a hard drive; a short term storage system, such as random access memory; a removable storage system, such as a floppy drive or a removable drive; and/or flash memory. Memory system 806a may include one or more machine-readable mediums that may store a variety of different types of information. The term machine-readable medium is used to refer to any non-transient medium capable carrying information that is readable by a machine. One example of a machine-readable medium is a non-transient computer-readable medium. Another example of a machine-readable medium is paper having holes that are detected that trigger different mechanical, electrical, and/or logic responses. Memory system 806a stores machine instructions for carrying out the methods disclosed in this specification. Memory 806a may also store the databases and information needed for carrying out the methods described in this specification. Knowledgebase 806b may be the knowledgebase described in this specification, which stores the information needed by the editors for updating the vocabulary dictionary and language dictionary (in addition to storing the vocabulary dictionary and language dictionary). Vocabulary dictionaries 806d is the vocabulary dictionary described elsewhere in this specification, which includes a recording of a sequence of three words, where the word in the middle is the word of interest. The word preceding and following the word of interest, are recorded to capture how the word proceeding the following the word of interest affect the manner in which the word is pronounced. Sequences having just two words or one word may also be included to capture how the word is pronounced when the word is the first word in an utterance, the last word in an utterance and/or the only word in the utterance. Language dictionaries 806e are the language dictionaries described in the rest of this specification, which include a recording of a single word stored in associated with a pronunciation of that word. The session database 806b include a collection of recordings of sessions and transcription of words identified. An editor may access the records of the session database to correct voice recognition errors. User Interface 806f provides the pages (e.g., web pages and/or information for filling in the pages of an application on another systems) with which the editor interacts with while accessing the records of the sessions database, correcting voice recognition errors and updating the vocabulary and/or a language dictionaries. API 806g includes the function calls that other systems may include in applications and/or programs to access the vocabulary and/or language dictionaries when performing voice recognition, user may use to view sessions, and/or an editor application may use to perform the editing.

Processor system 808 may include any one of, some of, any combination of, or all of multiple parallel processors, a single processor, a system of processors having one or more central processors and/or one or more specialized processors dedicated to specific tasks. Processor 808 carries out the machine instructions stored in memory system 806a.

Communications system 812 communicatively links output system 802, input system 804, memory system 806a, processor system 808, and/or input/output system 814 to each other. Communications system 812 may include any one of, some of, any combination of, or all of electrical cables, fiber optic cables, and/or means of sending signals through air or water (e.g. wireless communications), or the like. Some examples of means of sending signals through air and/or water include systems for transmitting electromagnetic waves such as infrared and/or radio waves and/or systems for sending sound waves.

Input/output system 814 may include devices that have the dual function as input and output devices. For example, input/output system 814 may include one or more touch sensitive screens, which display an image and therefore are an output device and accept input when the screens are pressed by a finger or stylus, for example. The touch sensitive screens may be sensitive to heat and/or pressure. One or more of the input/output devices may be sensitive to a voltage or current produced by a stylus, for example. Input/output system 814 is optional, and may be used in addition to or in place of output system 802 and/or input device 804.

Figure 9:
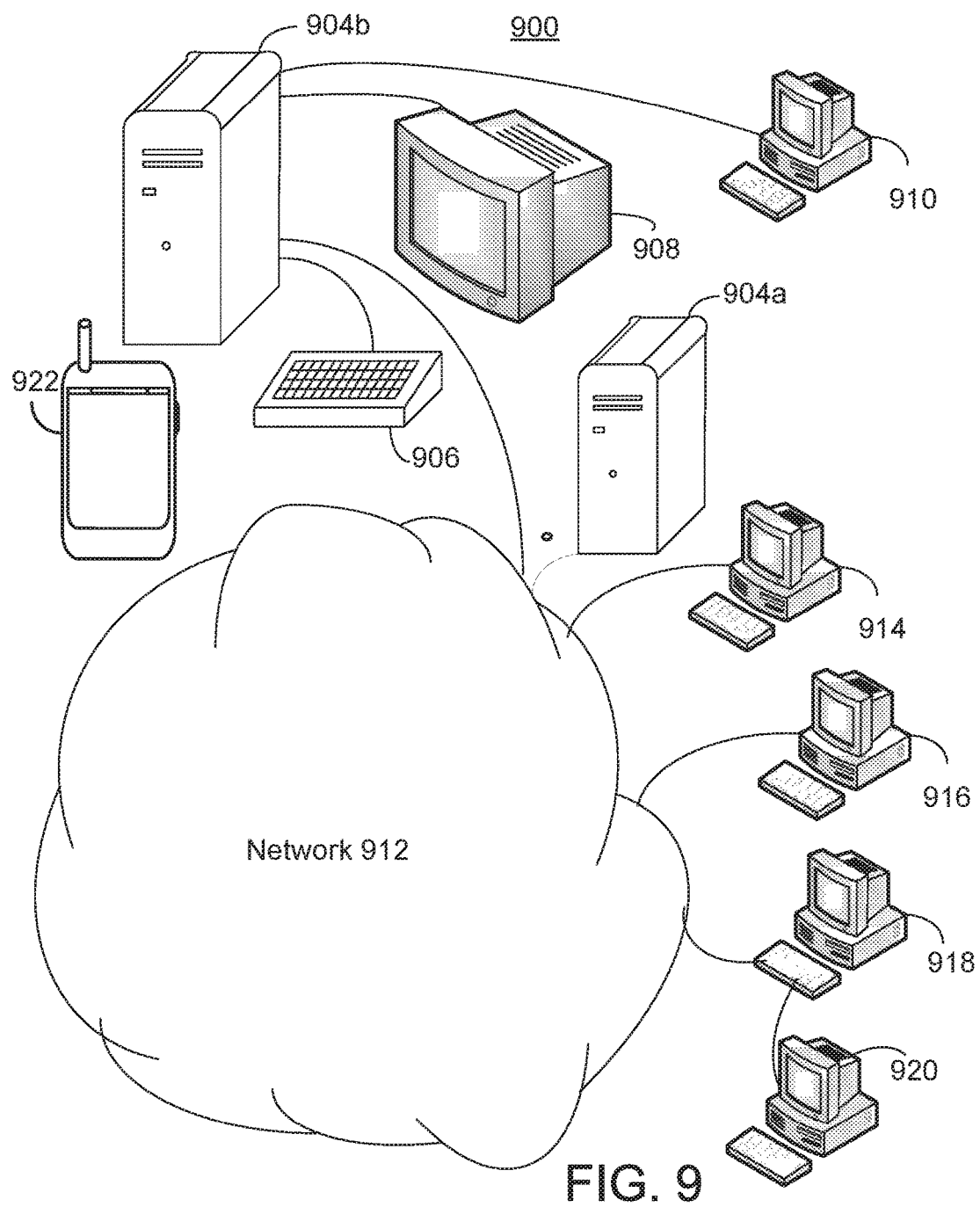
FIG. 9 illustrates a block diagram of an embodiment of a system for recognizing speech.

FIG. 9 illustrates a block diagram of an embodiment of a system 900 for recognizing speech. The system 900 includes a server system 904a and sever system 904b, an input system 906, an output system 908, a plurality of client systems 910, 914, 916, 918 and 920, a communications network 912 and a hand-held device 922. In other embodiments, the system 900 may include additional components and/or may not include all of the components listed above.

Server systems 904a and *b* may each include one or more servers. Server system 904a may store one or more machine instructions for performing voice recognition. Sever 904b may store the knowledgebase and may be used for correcting voice recognition errors and updating the vocabulary dictionaries and the language dictionaries. Server 904a may record speech, identify words in the speech and transcribe the speech into text and identify speck that could not be recognized with in a desired threshold of confidence. Server 904a may receive updates to the language and vocabulary dictionaries from, and/or access the language and vocabulary dictionaries of, server 904b. After transcribing the speech recorded and identifying the word recognition errors, server 904b may send information (e.g., records) about the sessions to server 904b, which are stored as records in a database on server 904b, so that the records are available to the editors from correcting the voice recognition errors and available to the end user to listen to the transcription after the voice recognition errors are corrected. Input system 906 system may be used for entering input into server system 904, and may include any one of, some of, any combination of, or all of a keyboard system, a mouse system, a track ball system, a track pad system, buttons on a handheld system, a scanner system, a wireless receiver, a microphone system, a connection to a sound system, and/or a connection and/or an interface system to a computer system, intranet, and/or the Internet (e.g., IrDA, USB), for example.

Output system 908 may be used for receiving output from server system 904, and may include any one of, some of, any combination of or all of a monitor system, a wireless transmitter, a handheld display system, a printer system, a speaker system, a connection or interface system to a sound system, an interface system to peripheral devices and/or a connection and/or an interface system to a computer system, intranet, and/or the Internet, for example.

The system 900 illustrates some of the variations of the manners of connecting to the server system 904a and/or 904b, which may be information providing site (not shown).

Server system 904a and b may be directly connected and/or wirelessly connected to the plurality of client systems 910, 914, 916, 918 and 920 and are connected, via the communications network 912. Client system 920 may be connected to server system 904 via client system 918. The communications network 912 may be any one of, or any combination of, one or more Local Area Networks (LANs), Wide Area Networks (WANs), wireless networks, telephone networks, the Internet and/or other networks. The communications network 912 may include one or more wireless portals. The client systems 910, 914, 916, 918 and 920 are any system that an end user may use to access the server system 904. For example, the client systems 910, 914, 916, 918 and 920 may be personal computers, workstations, laptop computers, game consoles, handheld network enabled audio/video players and/or any other network appliance.

The client system 920 accesses the server system 904 via the combination of the communications network 912 and another system, which in this example is client system 918. The client system 922 is an example of a handheld wireless device, such as a mobile phone or a handheld network enabled audio/music player, which may also be used for accessing network content. In another embodiment, any combinations of client systems 910, 914, 916, 918, 920 and/or 922 may include a GPS system.

Although the invention has been described with reference to specific embodiments, it may be understood by those skilled in the art that various changes may be made and equivalents may be substituted for elements thereof without departing from the true spirit and scope of the invention. In addition, modifications may be made without departing from the essential teachings of the invention. Those skilled in the art may appreciate that the methods of the present invention as described herein above may be modified once this description is known. Since changes and modifications are intended to be within the scope of the present invention, the above description should be construed as illustrative and not in a limiting sense, the scope of the invention being defined by the following claims.

The invention claimed is:

1. A system comprising:
a processor system including one or more processors;
a storage system including one or more storage units storing at least a database and a shared vocabulary dictionary; the storage system storing one or more machine instructions, which when implemented cause the system to implement a method including at least recording, at the system, a user pronouncing one or more words;
automatically, by the system, while recording, recognizing and extracting one or more words on the recording, and associating the one or more words recognized with digital text, based on a shared vocabulary dictionary, the shared vocabulary dictionary being shared by multiple unrelated users;
automatically, by the system, identifying at least one voice recognition error, the voice recognition error being a sound that the system was unable to automatically associate with digital text of a word;
automatically, by the system, storing the one or more words that were recognized in the database by at least storing in the database the recording of the pronouncing of the one or more words and the digital text of the one or more words in association with each other;
automatically, by the system, storing the at least one voice recognition error by storing a sound that the system was unable to recognize and an indication that a voice recognition error occurred in association with each other; receiving, at the system, and storing in the database said digital text to associate with the sound that the system was unable to recognize; and
updating a shared vocabulary dictionary by at least storing in the shared vocabulary dictionary the sound that the system was unable to identify and the digital text received in association with each other, so that the sound that the system was unable to recognize is recognizable by the system after the updating;
wherein the system extracts digital text of words and user pronunciations of the words extracted and updates the shared vocabulary dictionary on an ongoing basis.

2. The system of claim 1, the one or more machine instructions further include at least one machine instruction, which when implemented causes the method implemented by the system to further comprise:
prior to the recording, requesting, by the system, the user to enter identifying information; and in response, receiving at the system, one or more entries for the identifying information, and performing the recording.

3. The system of claim 2, the identifying information including at least a user-id of an individual speaking during a session during the recording of the user pronouncing the one or more words, the method implemented initiating the extracting based on the user-id.

4. The system of claim 1, wherein the automatically recognizing and associating of the one or more words recognized with the digital text includes identifying, by the system, a segment of the recording as a candidate for a word, in response to the identifying, comparing, by the system, the one or more words to recordings of words in the shared vocabulary dictionary; and determining, by the system, whether the segment of the recording matches one of the recordings of the words in the shared vocabulary dictionary.

5. The system of claim 1, the method further comprising:
prior to the associating of the one or more words recognized with the digital text, based on the shared vocabulary dictionary, determining, by the system, whether an association of the one or more words recognized can be made with the digital text, based on a personal vocabulary dictionary;
if an association of the one or more words recognized can be made with the digital text, based on the personal vocabulary dictionary, associating, by the system, the one or more words recognized with the digital text, based on the personal vocabulary dictionary.

6. The system of claim 1, the method further comprising:
updating, by the system, a personal vocabulary dictionary by at least storing in the personal vocabulary dictionary, in association with each other, the sound that the system was unable to identify and the digital text received, so that sound is recognizable by the system, when using the personal vocabulary dictionary for recognizing words, the personal vocabulary dictionary being a vocabulary dictionary having recordings of pronunciations of words by a single user in association with digital text of the words.

7. The system of claim 1, the shared vocabulary dictionary including at least one subject specific vocabulary dictionary.

8. The system of claim 1, the unrelated users being users that have different accounts that are not owned by a common legal entity and that are not sponsored by a common legal entity.

9. The system of claim 1, the recording including recordings from speech of multiple people, the method further comprising identifying one of the multiple people as having uttered a segment of the recording.

10. A system comprising:
a processor system including one or more processors;
a storage system including one or more storage units storing at least a database and a shared vocabulary dictionary; the storage system storing one or more machine instructions, which when implemented cause the system to implement a method including at least recording, at the system, a user pronouncing one or more words;
automatically, by the system, while recording, recognizing and extracting one or more words on the recording, and associating the one or more words recognized with digital text, based on a shared vocabulary dictionary, the shared vocabulary dictionary being shared by multiple unrelated users;
automatically, by the system, identifying at least one voice recognition error, the voice recognition error being a sound that the system was unable to automatically associate with digital text of a word;
automatically, by the system, storing the one or more words that were recognized in the database by at least storing in the database the recording of the pronouncing of the one or more words and the digital text of the one or more words in association with each other;
automatically, by the system, storing the at least one voice recognition error by storing a sound that the system was unable to recognize and an indication that a voice recognition error occurred in association with each other; receiving, at the system, and storing in the database said digital text to associate with the sound that the system was unable to recognize; and
updating a shared vocabulary dictionary by at least storing in the shared vocabulary dictionary the sound that the system was unable to identify and the digital text received in association with each other, so that the sound that the system was unable to recognize is recognizable by the system after the updating;
wherein the system extracts digital text of words and user pronunciations of the words extracted and updates the shared vocabulary dictionary on an ongoing basis;
wherein the automatically recognizing and associating of the one or more words recognized with the digital text includes identifying, by the system, a segment of the recording as a candidate for a word, in response to the identifying, comparing, by the system, the one or more words to recordings of words in the shared vocabulary dictionary; and determining, by the system, whether the segment of the recording matches one of the recordings of the words in the shared vocabulary dictionary;
performing an iterative process that includes at least enhancing, by the system, the segment of the recording and comparing the segment of the recording that was enhanced to the shared vocabulary dictionary, if a match is found, exiting, by the system, the iterative process and proceeding to a next step in the method, if a match is not found, checking one or more exit criteria, if the exit criteria is not met, repeating, by the system, the enhancing therein further enhancing the segment, and repeating, by the system, the comparing, but upon repetition, the comparing being performed with the segment after the segment was further enhanced;
if the one or more exit criteria are met, exiting, by the system, the iterative process and identifying, by the system, the segment as a voice recognition error.

11. A system comprising:
a processor system including one or more processors;
a storage system including one or more storage units storing at least a database and a shared vocabulary dictionary; the storage system storing one or more machine instructions, which when implemented cause the system to implement a method including at least recording, at the system, a user pronouncing one or more words;
automatically, by the system, while recording, recognizing and extracting one or more words on the recording, and associating the one or more words recognized with digital text, based on a shared vocabulary dictionary, the shared vocabulary dictionary being shared by multiple unrelated users;
automatically, by the system, identifying at least one voice recognition error, the voice recognition error being a sound that the system was unable to automatically associate with digital text of a word;
automatically, by the system, storing the one or more words that were recognized in the database by at least storing in the database the recording of the pronouncing of the one or more words and the digital text of the one or more words in association with each other;
automatically, by the system, storing the at least one voice recognition error by storing a sound that the system was unable to recognize and an indication that a voice recognition error occurred in association with each other; receiving, at the system, and storing in the database said digital text to associate with the sound that the system was unable to recognize; and
updating a shared vocabulary dictionary by at least storing in the shared vocabulary dictionary the sound that the system was unable to identify and the digital text received in association with each other, so that the sound that the system was unable to recognize is recognizable by the system after the updating;
wherein the system extracts digital text of words and user pronunciations of the words extracted and updates the shared vocabulary dictionary on an ongoing basis, the shared vocabulary dictionary including at least recordings of combinations of consecutive words that are associated with a particular word as different pronunciations of the particular word, the particular word being between two other words in the recordings of the combinations of consecutive words, therein capturing variations of pronunciations of a single word according to a word that proceeds the word that is between two other words and a word that follows the word that is between two other words.

12. The system of claim 11, the method further comprising:
updating, by the system, a shared library dictionary by at least storing in the shared library dictionary the sound that the system was unable to identify and the digital text received in association with each other, so that the sound is recognizable by the system, when using the shared library dictionary for recognizing words, the shared library dictionary including recordings of individual words in association with digital text of the individual words.

13. A system comprising:

a processor system including one or more processors;

a storage system including one or more storage units storing at least a database and a shared vocabulary dictionary; the storage system storing one or more machine instructions, which when implemented cause the system to implement a method including at least recording, at the system, a user pronouncing one or more words;

automatically, by the system, while recording, recognizing and extracting one or more words on the recording, and associating the one or more words recognized with digital text, based on a shared vocabulary dictionary, the shared vocabulary dictionary being shared by multiple unrelated users;

automatically, by the system, identifying at least one voice recognition error, the voice recognition error being a sound that the system was unable to automatically associate with digital text of a word;

automatically, by the system, storing the one or more words that were recognized in the database by at least storing in the database the recording of the pronouncing of the one or more words and the digital text of the one or more words in association with each other;

automatically, by the system, storing the at least one voice recognition error by storing a sound that the system was unable to recognize and an indication that a voice recognition error occurred in association with each other; receiving, at the system, and storing in the database said digital text to associate with the sound that the system was unable to recognize; and updating a shared vocabulary dictionary by at least storing in the shared vocabulary dictionary the sound that the system was unable to identify and the digital text received in association with each other, so that the sound that the system was unable to recognize is recognizable by the system after the updating;

wherein the system extracts digital text of words and user pronunciations of the words extracted and updates the shared vocabulary dictionary on an ongoing basis;

the recording including recordings from speech of multiple people, the method further comprising identifying one of the multiple people as having uttered a segment of the recording;

determining, by the system, that one of the multiple people is an unregistered user;

requesting, by the system, the unregistered user to read text;

recording, by the system, the text read by the unregistered user as the unregistered user reads the text;

automatically training the system to recognize words spoken by the unregistered user, based on the recording of the text read by the unregistered user.

14. A system comprising:

a processor system including one or more processors;

a storage system including one or more storage units storing at least a database and a shared vocabulary dictionary; the storage system storing one or more machine instructions, which when implemented cause the system to implement a method including at least recording, at the system, a user pronouncing one or more words;

automatically, by the system, while recording, recognizing and extracting one or more words on the recording, and associating the one or more words recognized with digital text, based on a shared vocabulary dictionary, the shared vocabulary dictionary being shared by multiple unrelated users;

automatically, by the system, identifying at least one voice recognition error, the voice recognition error being a sound that the system was unable to automatically associate with digital text of a word;

automatically, by the system, storing the one or more words that were recognized in the database by at least storing in the database the recording of the pronouncing of the one or more words and the digital text of the one or more words in association with each other;

automatically, by the system, storing the at least one voice recognition error by storing a sound that the system was unable to recognize and an indication that a voice recognition error occurred in association with each other; receiving, at the system, and storing in the database said digital text to associate with the sound that the system was unable to recognize; and updating a shared vocabulary dictionary by at least storing in the shared vocabulary dictionary the sound that the system was unable to identify and the digital text received in association with each other, so that the sound that the system was unable to recognize is recognizable by the system after the updating;

wherein the system extracts digital text of words and user pronunciations of the words extracted and updates the shared vocabulary dictionary on an ongoing basis;

the recording including recordings from speech of multiple people, the method further comprising identifying one of the multiple people as having uttered a segment of the recording;

determining, by the system, that at least one of the multiple people is an unregistered user and that at least one of the multiple people is a registered user;

for each registered user, prior to the associating of the one or more words recognized with the digital text, based on the shared vocabulary dictionary, determining whether an association of the one or more words recognized can be made with the digital text, based on a personal vocabulary dictionary, and if an association of the one or more words recognized can be made with the digital text, based on the personal vocabulary dictionary, associating the one or more words recognized with the digital text, based on the personal vocabulary dictionary;

and for each unregistered user performing the associating based on the shared vocabulary dictionary.

15. A system comprising:

a processor system including one or more processors;

a storage system including one or more storage units storing at least a database and a shared vocabulary dictionary; the storage system storing one or more machine instructions, which when implemented cause the system to implement a method including at least recording, at the system, a user pronouncing one or more words;

automatically, by the system, while recording, recognizing and extracting one or more words on the recording, and associating the one or more words recognized with digital text, based on a shared vocabulary dictionary, the shared vocabulary dictionary being shared by multiple unrelated users;

automatically, by the system, identifying at least one voice recognition error, the voice recognition error being a sound that the system was unable to automatically associate with digital text of a word;

automatically, by the system, storing the one or more words that were recognized in the database by at least storing in the database the recording of the pronouncing of the one or more words and the digital text of the one or more words in association with each other;

automatically, by the system, storing the at least one voice recognition error by storing a sound that the system was unable to recognize and an indication that a voice recognition error occurred in association with each other; receiving, at the system, and storing in the database said digital text to associate with the sound that the system was unable to recognize; and updating a shared vocabulary dictionary by at least storing in the shared vocabulary dictionary the sound that the system was unable to identify and the digital text received in association with each other, so that the sound that the system was unable to recognize is recognizable by the system after the updating;

wherein the system extracts digital text of words and user pronunciations of the words extracted and updates the shared vocabulary dictionary on an ongoing basis;

the recording including recordings from speech of multiple people, the method further comprising identifying one of the multiple people as having uttered a segment of the recording;

detecting, by the system, a plurality of people speaking simultaneously, and in response, interrupting the recording, by the system, and indicating, by the system that the plurality of people speaking simultaneously was not recorded prior to continuing the recording.

16. A system comprising:
a processor system including one or more processors;
a storage system including one or more storage units storing at least a database and a shared vocabulary dictionary; the storage system storing one or more machine instructions, which when implemented cause the system to implement a method including at least recording, at the system, a user pronouncing one or more words;
automatically, by the system, while recording, recognizing and extracting one or more words on the recording, and associating the one or more words recognized with digital text, based on a shared vocabulary dictionary, the shared vocabulary dictionary being shared by multiple unrelated users;
automatically, by the system, identifying at least one voice recognition error, the voice recognition error being a sound that the system was unable to automatically associate with digital text of a word;
automatically, by the system, storing the one or more words that were recognized in the database by at least storing in the database the recording of the pronouncing of the one or more words and the digital text of the one or more words in association with each other;
automatically, by the system, storing the at least one voice recognition error by storing a sound that the system was unable to recognize and an indication that a voice recognition error occurred in association with each other; receiving, at the system, and storing in the database said digital text to associate with the sound that the system was unable to recognize; and
updating a shared vocabulary dictionary by at least storing in the shared vocabulary dictionary the sound that the system was unable to identify and the digital text received in association with each other, so that the sound that the system was unable to recognize is recognizable by the system after the updating;
wherein the system extracts digital text of words and user pronunciations of the words extracted and updates the shared vocabulary dictionary on an ongoing basis, the method further comprising:
presenting, by the system, to an editor, one or more records of speech that the system processed; the one or more records including text of speech that was recognized as words and indications of speech that was not recognized; and
presenting, by the system, to the editor one or more tools, which when activated by the editor, cause a single indication of speech that was not recognized to be divided into multiple words that were not recognized.

17. The system of claim 16, the method further comprising
providing, by the system, one or more tools for listening to the speech that was not recognized and associating text with the speech that was not recognized.

18. The system of claim 17, wherein the updating of the shared vocabulary system is based on the associating of the speech that was not recognized with text.

19. The system of claim 16, further comprising:
a set of tools including at least one tool of the set of tools, which when activated, chooses a specific text of a word stored in the system;
at least one tool of the set of tools, which when activated causes the system to associate the speech that was not recognized with the specific text of the word that was chosen, as an alternate pronunciation of the specific text of the word that was chosen.

20. The system of claim 16, the editor being located remotely from and being different than the user pronouncing the word recorded.

21. The system of claim 16, the editor being an individual that did not participate in a session including the recording.

22. A system comprising:
a processor system including one or more processors;
a storage system including one or more storage units storing at least a database and a shared vocabulary dictionary; the storage system storing one or more machine instructions, which when implemented cause the system to implement a method including at least recording, at the system, a user pronouncing one or more words;
automatically, by the system, while recording, recognizing and extracting one or more words on the recording, and associating the one or more words recognized with digital text, based on a shared vocabulary dictionary, the shared vocabulary dictionary being shared by multiple unrelated users;
automatically, by the system, identifying at least one voice recognition error, the voice recognition error being a sound that the system was unable to automatically associate with digital text of a word;
automatically, by the system, storing the one or more words that were recognized in the database by at least storing in the database the recording of the pronouncing of the one or more words and the digital text of the one or more words in association with each other;
automatically, by the system, storing the at least one voice recognition error by storing a sound that the system was unable to recognize and an indication that a voice recognition error occurred in association with each other; receiving, at the system, and storing in the database said digital text to associate with the sound that the system was unable to recognize; and updating a shared vocabulary dictionary by at least storing in the shared vocabulary dictionary the sound that the system was unable to identify and the digital text received in association with each other, so that the sound that the system was unable to recognize is recognizable by the system after the updating;

wherein the system extracts digital text of words and user pronunciations of the words extracted and updates the shared vocabulary dictionary on an ongoing basis, the method further comprising:

presenting, by the system, to an editor, one or more records of speech that the system processed; the one or more records including text of speech that was recognized as words and indications of speech that was not recognized; and presenting, by the system, to the editor one or more tools, which when activated by the editor, cause a single indication of speech that was not recognized to be divided into multiple words that were not recognized;

receiving, at the system, from the editor a selection of a record;

in response to the receiving, sending to the editor information which when consumed by a viewing device causes text corresponding to speech associated with the record to be displayed, the text of the speech being interrupted with highlighted regions indicating speech that was not recognized.

23. A system comprising:
a processor system including one or more processors;
a storage system including one or more storage units storing at least a database and a shared vocabulary dictionary;
the storage system storing one or more machine instructions, which when implemented cause the system to implement a method including at least recording, at the system, a user pronouncing one or more words;
automatically extracting characteristics of the user's speech and retraining an acoustic model based on the characteristics of the user's speech and storing a recording of the speech used for the retraining in association with a text version of the speech as retraining data;
recording, at the system, a user pronouncing one or more words;
automatically, by the system, storing voice recognition data in associated with a vocabulary dictionary, therein updating the vocabulary dictionary, the voice recognition data including an association of utterance made by a user with text;
automatically extending the retraining data to include information from the voice recognition data;
automatically retraining the acoustic model by at least extracting speech characteristics based on the extended retraining data;
wherein the updating of the vocabulary dictionary includes
performing the automatically extending the retraining data and performing the automatically retraining of the acoustic model on an ongoing basis;
a set of tools including at least one tool of the set of tools, which when activated, chooses a specific text of a word stored in the system;
at least one tool of the set of tools when activated causes the system to associate the speech that was not recognized with the specific text of the word, as an alternate pronunciation of the specific text of the word that was chosen;

wherein when no text is found in the system to associate with the speech that was not recognized, the set of the tools enables an editor to store in the system new text in association with the speech that was not recognized as a pronunciation of the new text.

24. The system of claim 23, further comprising: storing the pronunciation of the one or more words in combination with the word spoken before the one or more words and the word spoken after the one or more words.

25. A system comprising:
a processor system including one or more processors;
a storage system including one or more storage units storing at least a database and a shared vocabulary dictionary; the storage system storing one or more machine instructions, which when implemented cause the system to implement a method including at least recording, at the system, a user pronouncing one or more words;
automatically, by the system, while recording, recognizing and extracting one or more words on the recording, and associating the one or more words recognized with digital text, based on a shared vocabulary dictionary, the shared vocabulary dictionary being shared by multiple unrelated users;
automatically, by the system, identifying at least one voice recognition error, the voice recognition error being a sound that the system was unable to automatically associate with digital text of a word;
automatically, by the system, storing the one or more words that were recognized in the database by at least storing in the database the recording of the pronouncing of the one or more words and the digital text of the one or more words in association with each other;
automatically, by the system, storing the at least one voice recognition error by storing a sound that the system was unable to recognize and an indication that a voice recognition error occurred in association with each other; receiving, at the system, and storing in the database said digital text to associate with the sound that the system was unable to recognize; and
updating a shared vocabulary dictionary by at least storing in the shared vocabulary dictionary the sound that the system was unable to identify and the digital text received in association with each other, so that the sound that the system was unable to recognize is recognizable by the system after the updating;
wherein the system extracts digital text of words and user pronunciations of the words extracted and updates the shared vocabulary dictionary on an ongoing basis;
presenting, by the system, to a human editor, one or more records of speech that the system processed, the human editor being an individual that did not participate in a session in which the recording was recorded;
the one or more records including text of speech that was recognized as words and indications of speech that was not recognized; and
presenting, by the system, to the human editor one or more tools, which when activated by the editor, cause a single indication of speech that was not recognized to be divided into multiple words that were not recognized.

26. A system comprising:

a processor system including one or more processors;

a storage system including one or more storage units storing at least a database and a shared vocabulary dictionary;

the storage system storing one or more machine instructions, which when implemented cause the system to implement a method including at least recording, at the system, a user pronouncing one or more words;

automatically extracting characteristics of the user's speech and retraining an acoustic model based on the characteristics of the user's speech and storing a recording of the speech used for the retraining in association with a text version of the speech as retraining data;

recording, at the system, a user pronouncing one or more words;

automatically, by the system, storing voice recognition data in associated with a vocabulary dictionary, therein updating the vocabulary dictionary, the voice recognition data including an association of utterance made by a user with text;

automatically extending the retraining data to include information from the voice recognition data;

automatically retraining the acoustic model by at least extracting speech characteristics based on the extended retraining data;

wherein the updating of the vocabulary dictionary includes performing the automatically extending the retraining data and performing the automatically retraining of the acoustic model on an ongoing basis;

presenting, by the system, to a human editor, one or more records of speech that the system processed, the human editor being an individual that did not participate in a session in which the recording was recorded;

the one or more records including text of speech that was recognized as words and indications of speech that was not recognized; and presenting, by the system, to the human editor one or more tools, which when activated by the editor, cause a single indication of speech that was not recognized to be divided into multiple words that were not recognized.

* * * * *

UNITED STATES PATENT AND TRADEMARK OFFICE
CERTIFICATE OF CORRECTION

PATENT NO. : 9,947,313 B2
APPLICATION NO. : 15/415850
DATED : April 17, 2018
INVENTOR(S) : William Drewes Page 1 of 1

It is certified that error appears in the above-identified patent and that said Letters Patent is hereby corrected as shown below:

In the Claims

In the Claim 23, please replace Column number 55, Line numbers 38 and 39, with "implement a method including at least
    recording, at the system, a user pronouncing one or more words;".

In the Claim 23, please delete Column number 55, Line numbers 46 and 47.

In the Claim 26, please replace Column number 57, Line numbers 8 and 9, with "implement a method including at least
    recording, at the system, a user pronouncing one or more words;".

In the Claim 26, please delete Column number 57, Line numbers 16 and 17.

Signed and Sealed this
Eleventh Day of September, 2018

Andrei Iancu
*Director of the United States Patent and Trademark Office*